(12) United States Patent
Yi et al.

(10) Patent No.: US 9,967,720 B2
(45) Date of Patent: May 8, 2018

(54) MOBILE TERMINAL AND METHOD FOR CONTROLLING THE SAME

(71) Applicant: LG ELECTRONICS INC., Seoul (KR)

(72) Inventors: Dongo Yi, Seoul (KR); Seyoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 37 days.

(21) Appl. No.: 14/728,906

(22) Filed: Jun. 2, 2015

(65) Prior Publication Data
US 2015/0373513 A1    Dec. 24, 2015

(30) Foreign Application Priority Data
Jun. 23, 2014  (KR) .......................... 10-2014-0076697

(51) Int. Cl.
| H04W 4/00 | (2009.01) |
| H04W 4/12 | (2009.01) |
| H04M 1/725 | (2006.01) |
| H04W 88/02 | (2009.01) |

(52) U.S. Cl.
CPC ......... *H04W 4/12* (2013.01); *H04M 1/72552* (2013.01); *H04W 88/02* (2013.01)

(58) Field of Classification Search
CPC .............................. H04W 4/12; H04W 88/02
USPC ..................................... 455/466, 414.1, 566
See application file for complete search history.

(56) References Cited

U.S. PATENT DOCUMENTS

2012/0231770 A1* 9/2012 Clarke ................ H04L 12/5885
                                                              455/414.1
2013/0083155 A1    4/2013 Andresen

FOREIGN PATENT DOCUMENTS

| EP | 2378750 | 10/2011 |
| EP | 2475137 | 7/2012 |
| KR | 10-2005-0040195 | 5/2005 |
| KR | 10-2006-0080950 | 7/2006 |
| KR | 10-2014-0009765 | 1/2014 |
| KR | 10-2014-0023243 | 2/2014 |

(Continued)

OTHER PUBLICATIONS

Korean Intellectual Property Office Application Serial No. 10-2014-0076697, Office Action dated Feb. 1, 2016, 5 pages.

(Continued)

*Primary Examiner* — Chuck Huynh
(74) *Attorney, Agent, or Firm* — Lee, Hong, Degerman, Kang & Waimey PC

(57) ABSTRACT

The present disclosure relates to a mobile terminal for transmitting and receiving messages and a control method thereof. A mobile terminal according to an embodiment of the present disclosure may include a display unit configured to display at least one message transmitted to and received from at least one user terminal and receive a touch input for selecting one of the at least one message; a controller configured to control the display unit that displays icons corresponding to the at least one user terminal, respectively, to distinguish whether or not the selected message has been checked for each of the at least one user terminal; and a wireless communication unit configured to transmit a check request message of the selected message to a user terminal corresponding to the selected one of the displayed icons.

20 Claims, 33 Drawing Sheets

(56) References Cited

FOREIGN PATENT DOCUMENTS

WO        03/028345      4/2003
WO     2011/130839   10/2011

OTHER PUBLICATIONS

European Patent Office Application Serial No. 15001722.6, Search Report dated Nov. 27, 2015, 9 pages.

\* cited by examiner

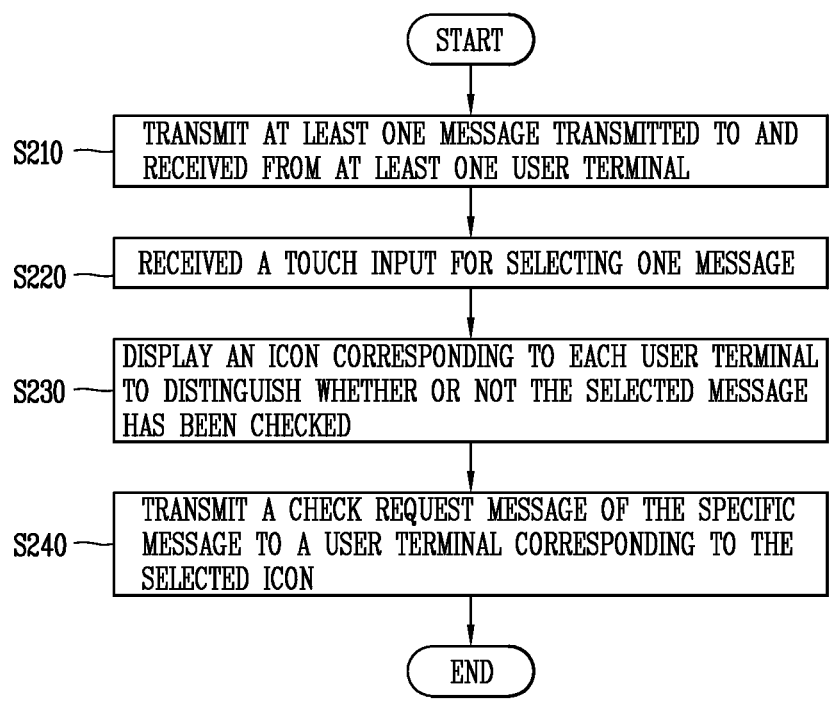

MOBILE TERMINAL AND METHOD FOR CONTROLLING THE SAME

RELATED APPLICATION

Pursuant to 35 U.S.C. § 119(a), this application claims the benefit of earlier filing date and right of priority to Korean Patent Application No. 10-2014-0076697, filed on Jun. 23, 2014, the contents of which are hereby incorporated by reference herein in its entirety.

BACKGROUND OF THE INVENTION

1. Field of the Invention

The present disclosure relates to a mobile terminal for transmitting and receiving messages and a control method thereof.

2. Description of the Related Art

Terminals may be generally classified into mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player.

Furthermore, a message may be sent and received between a plurality of terminals through various messengers. However, in order to request a message check to a terminal that has not checked a message among the plurality of terminals, messages should be repeatedly transmitted to the terminal that has not checked the message in the relevant chat room. Otherwise, there exists inconvenience in which an additional means for transmitting a one-to-one message or making a call to the terminal that has not checked the message should be used.

Efforts are ongoing to support and increase the functionality of mobile terminals. Such efforts include software and hardware improvements, as well as changes and improvements in the structural components.

SUMMARY OF THE INVENTION

An aspect of the present disclosure is to solve the foregoing problem and other problems. Another aspect of the present disclosure is to provide a mobile terminal for requesting the checking of a specific message and a control method thereof.

In order to accomplish the above and other objects, according to an aspect of the present disclosure, there is provided a mobile terminal including a display unit configured to display at least one message transmitted to and received from at least one user terminal and receive a touch input for selecting one of the at least one message; a controller configured to control the display unit that displays icons corresponding to the at least one user terminal, respectively, to distinguish whether or not the selected message has been checked for each of the at least one user terminal; and a wireless communication unit configured to transmit a check request message of the selected message to a user terminal corresponding to the selected one of the displayed icons.

According to an embodiment, the display unit may receive a touch input for selecting a message with a touch input applied to a region displayed with the message.

According to an embodiment, the controller may control the display unit to display a first image effect on an icon corresponding to a user terminal that has checked the selected message.

According to an embodiment, the controller controls the display unit to display a second image effect different from the first image effect on an icon corresponding to a user terminal that has received a check request message of the selected message.

According to an embodiment, the wireless communication unit may transmit an additionally entered message to a user terminal corresponding to the selected icon along with the check request message.

Furthermore, according to another aspect of the present disclosure, there is provided a control method of a mobile terminal, and the method may include (a) displaying at least one message transmitted to and received from at least one user terminal; (b) receiving a touch input for selecting one of the at least one message; (c) displaying icons corresponding to the at least one user terminal, respectively, to distinguish whether or not the selected message has been checked for each of the at least one user terminal; and (d) transmitting a check request message of the selected message to a user terminal corresponding to the selected one of the displayed icons.

According to an embodiment, said step (b) may include receiving a touch input for selecting a message with a touch input applied to a region displayed with the message.

According to an embodiment, said step (c) may include displaying a first image effect on an icon corresponding to a user terminal that has checked the selected message.

According to an embodiment, said step (c) may include displaying a second image effect different from the first image effect on an icon corresponding to a user terminal that has received a check request message of the selected message.

According to an embodiment, said step (d) may include transmitting an additionally entered message to a user terminal corresponding to the selected icon along with the check request message.

Furthermore, according to another aspect of the present disclosure, there is provided a mobile terminal including a display unit configured to display a check request message of a message received from at least one user terminal; and a controller configured to control the display unit to display a message dialog window to the at least one user terminal, and display the message on the message dialog window with the application of an automatic scroll input to the message dialog window when a check icon of the message contained in a region displayed with the check request message is selected.

According to an embodiment, when an icon for transmitting a check acknowledgement message to a terminal that has transmitted the check request message contained in a region displayed with the check request message is selected, the controller may transmit the check acknowledgement message for notifying that the message has been checked to the user terminal.

According to an embodiment, the controller may control the display unit to display an additionally received message along with the check request message to be displayed along with the message.

According to an embodiment, the controller may control the display unit to display an image effect distinguished from a region displayed with a message other than the message in a region displayed with the message.

According to an embodiment, the controller may control the display unit to display an icon indicating the number of check request messages received from the at least one user terminal on the message dialog window.

Furthermore, according to still another aspect of the present disclosure, there is provided a control method of a mobile terminal, and the method may include (a) receiving a message from at least one user terminal; (b) receiving and displaying a check request message of the message; and (c) displaying a message dialog window to the at least one user terminal, and then displaying the message on the message dialog window with the application of an automatic scroll input to the message dialog window when a check icon of the message contained in a region displayed with the check request message is selected.

According to an embodiment, said step (c) may include transmitting a check acknowledgement message for notifying that the message has been checked to a user terminal when an icon for transmitting the check acknowledgement message to the user terminal that has transmitted the check request message contained in a region displayed with the check request message is selected.

According to an embodiment, said step (c) may include displaying an additionally received message along with the check request message to be displayed along with the message.

According to an embodiment, said step (c) may include displaying an image effect distinguished from a region displayed with a message other than the message in a region displayed with the message.

According to an embodiment, said step (c) may include displaying an icon indicating the number of check request messages received from the at least one user terminal on the message dialog window.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 2 is a flow chart for explaining an embodiment of a mobile terminal transmitting a check request message according to the present disclosure;

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
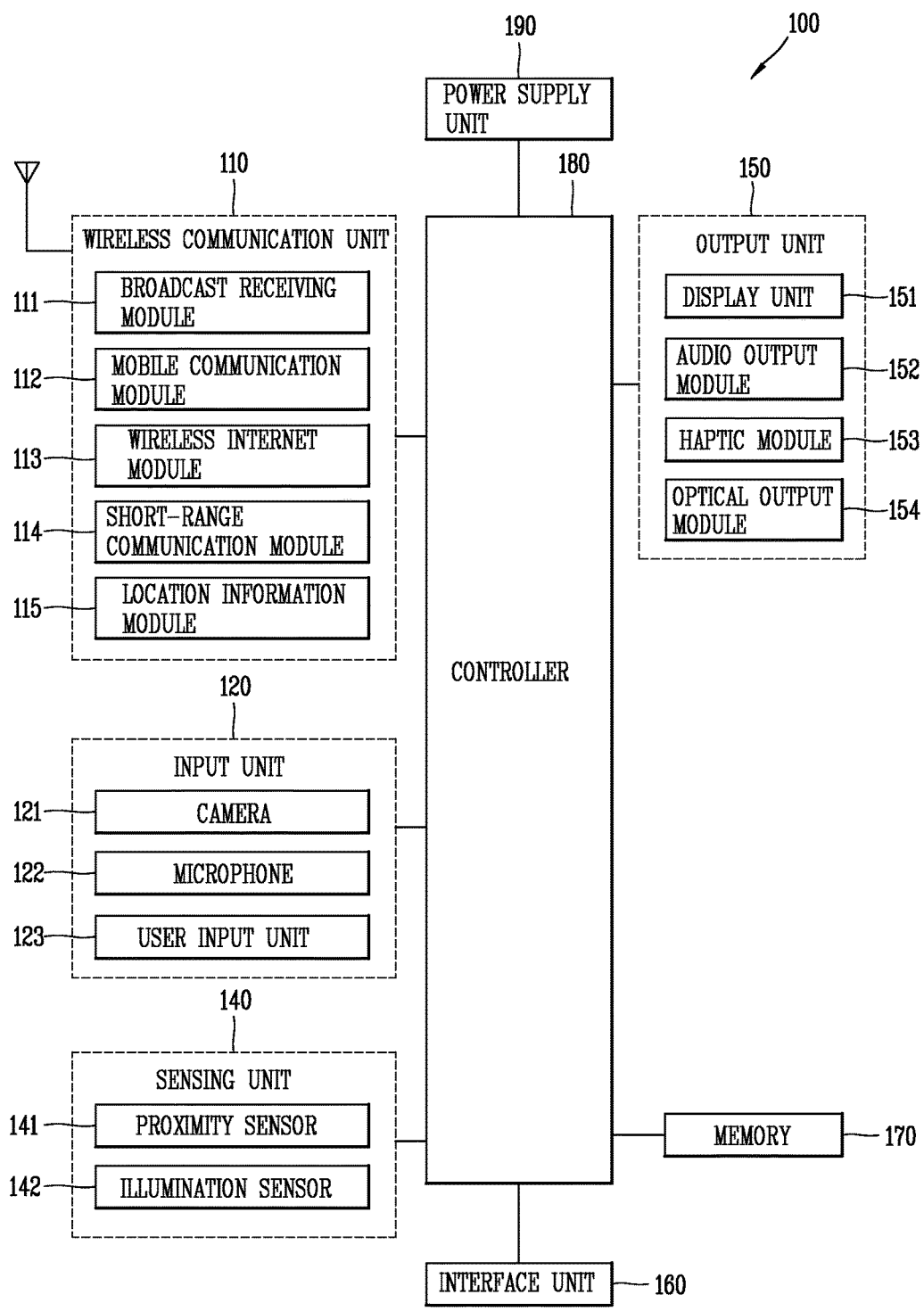
FIG. 1A is a block diagram for explaining a mobile terminal associated with the present disclosure.
Figure 1B:
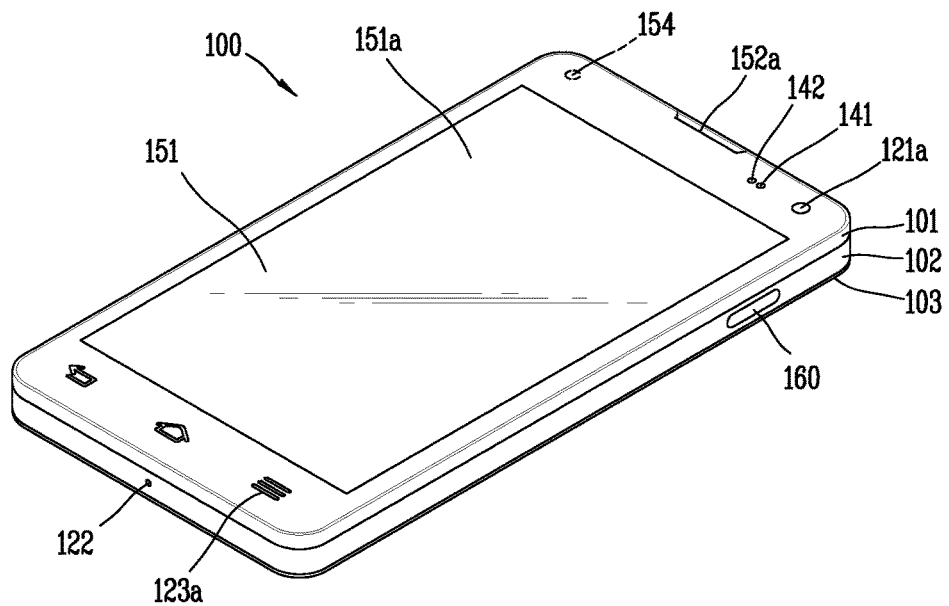
FIGS. 1B and 1C are conceptual views illustrating an example in which a mobile terminal associated with the present disclosure is seen from different directions.
Figure 1C:
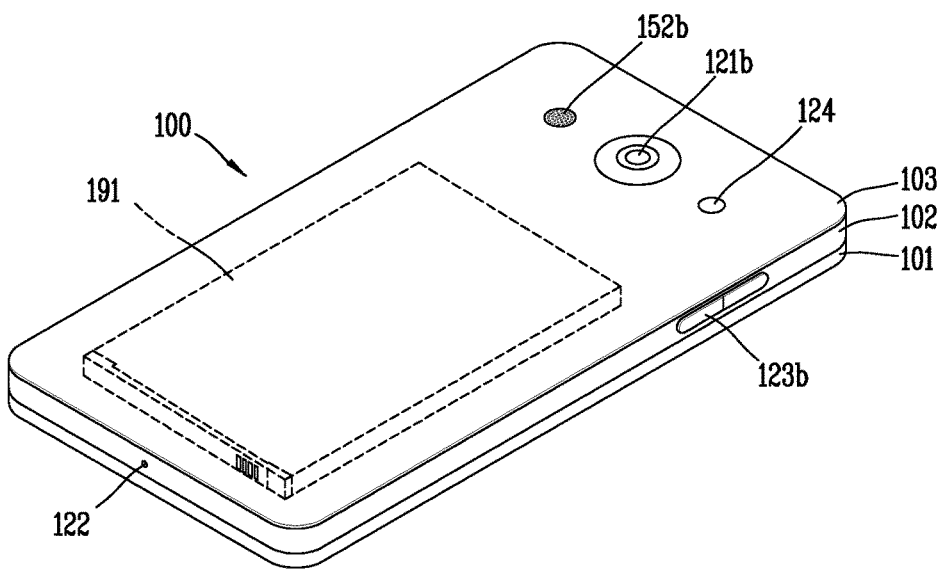

Referring to FIGS. 1A through 1C, FIG. 1A is a block diagram of a mobile terminal in accordance with the present disclosure, and FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), etc.)

Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), Long Term Evolution (LTE), and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LET and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wi-Fi module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module.

Hereinafter, the input unit 120 will be described in more detail. The input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor. The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit 152 may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like. Furthermore, the first and second manipulation units 123a and 123b may employ any method allowing the user to perform manipulation with no tactile feeling such as a proximity touch, a hovering touch or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method which can be implemented in the mobile terminal having the foregoing configuration will be described with reference to the attached drawings. It should be understood by those skilled in the art that the present invention can be embodied in other specific forms without departing from the concept and essential characteristics thereof.

FIG. 2 is a flow chart for explaining an embodiment of a mobile terminal transmitting a check request message according to the present disclosure.

Referring to FIG. 2, first, the process (S210) of displaying at least one message transmitted to and received from at least one user terminal is carried Out.

For an embodiment, one or more texts or messenger messages transmitted to and received from one user terminal, one or more messenger messages transmitted to and received from a plurality of user terminals, and the like may be displayed.

Subsequently, the process (S220) of receiving a touch input for selecting one of the displayed at least one message is carried out. Here, touch input may have various input forms, such as a short touch, a long touch, a tap input configured with one or more taps, and the like.

Specifically, a touch input for selecting a message may be received using a tap input applied within a region displayed with the message. A tap input may be defined as consecutive touch inputs applied within one region of the touch screen 151. The tap input may be a bundle of consecutive touch inputs applied within one region within a predetermined period of time. In other words, a tap input may be defined as a bundle of one or more touch inputs received within a predetermined period of time. Furthermore, the tap input may be a bundle of touch inputs consecutively applied within a predetermined time interval. In other words, it may be a bundle of an (n+1)-th touch input within a predetermined period of time subsequent to receiving an n-th (n>=1) touch input even without any set total input time.

In the following specification, such a tap input may be similar to a typically performed "knock", and thus expressed as a "knock". Furthermore, a check request message may be a message for requesting the checking of a message selected by a knock, and thus the "transmission of a check request message" may be expressed as "knock transmitted".

Next, the process (S230) of displaying icons corresponding to at least one user terminal, respectively, is carried out to distinguish whether or not the selected message has been checked for each of the at least one user terminal.

Specifically, a first image effect may be displayed on an icon corresponding to a user terminal that has not checked the selected message. Furthermore, a second image effect different from the first image effect may be displayed on an icon corresponding to a user terminal that has not checked the selected message but has received a check request message.

Then, the process (S240) of transmitting a check request message of the selected message to a user terminal corresponding to an icon selected from the displayed icons is carried out.

Specifically, check request message denotes an additional message for requesting the checking of the selected message as a message distinguished from the selected message.

Furthermore, an additionally entered message may be transmitted to a user terminal corresponding to the selected icon along with the check request message.

Figure 3:
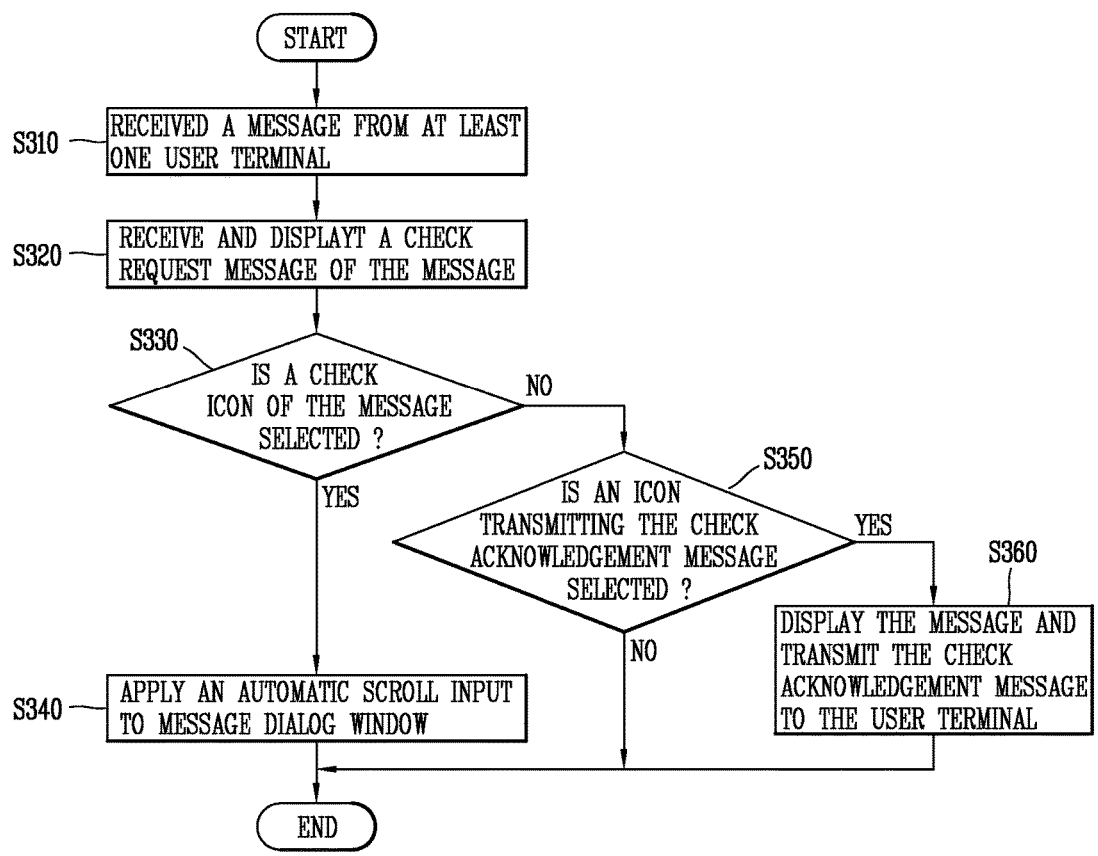
FIG. 3 is a flow chart for explaining an embodiment of a mobile terminal receiving a check request message according to the present disclosure.

FIG. 3 is a flow chart for explaining an embodiment of a mobile terminal receiving a check request message according to the present disclosure.

Referring to FIG. 3, first, the process (S310) of receiving a message from at least one user terminal is carried out.

For an embodiment, one or more texts or messenger messages may be received from one or more user terminals.

Subsequently, the process (S320) of receiving and displaying a check request message of the message. As described above, the check request message the message denotes an additional message for requesting the checking of the message.

Next, the process (S330) of determining whether a check icon of the message contained in a region displayed with the check request message is selected is carried out.

When the check icon of the message is selected, the process (S340) of displaying a message dialog window to at least one user terminal, and then displaying the message for which checking has been requested on the message dialog window with the application of an automatic scroll input to the message dialog window is carried out.

When the check icon of a message is not selected, the process (S350) of determining whether an icon transmitting a check acknowledgement message to a user terminal that has transmitted the check request message contained in a region displayed with the check request message is carried out.

When an icon transmitting a check acknowledgement message to a user terminal that has transmitted the check request message is selected, the process (S360) of displaying a message dialog window to at least one user terminal, and then displaying a check request message on the message dialog window with the application of an automatic scroll input to the message dialog window, and transmitting a check acknowledgement message for notifying that the message for which checking has been requested has been checked is carried out.

At this time, when an icon transmitting a check message to a user terminal that has transmitted the check request message is not selected, the relevant procedure is ended.

In the following specification, such a "tap input" may be similar to a typically performed "knock", and thus expressed as a "knock". Furthermore, a check request message may be a message for requesting the checking of a message selected by a knock, and thus the "transmission of a check request message" may be expressed as "knock transmitted". Similarly, the "reception of a check request message" may be expressed as "knock received".

In the following drawings, a user terminal transmitting a check request message will be described as reference numeral 100-1, and a user terminal receiving a check request message as reference numeral as 100-2 in a separate manner.

The terms including an ordinal number such as first, second, etc. can be used to describe various elements, but the elements should not be limited by those terms. The terms are used merely for the purpose to distinguish an element from the other element.

Furthermore, according to the following drawings, a chat room in which messages are transmitted and received between a plurality of user terminals will be described as an embodiment, but the present disclosure may not be necessarily limited to this. In other words, it may be applicable to a case where messenger messages or text messages are transmitted and received on the basis of one-to-one.

Specifically, a message for requesting the checking of a specific message transmitted from a one-to-one messenger chat room may be transmitted to the other chat terminal (knock transmitted).

Furthermore, according to an input for the checking of a specific message in the other terminal that has received a check request message (knock received), a one-to-one messenger chat room or text message dialog window to which an automatic scroll input is applied may be displayed until the specific message is displayed.

Figure 4:
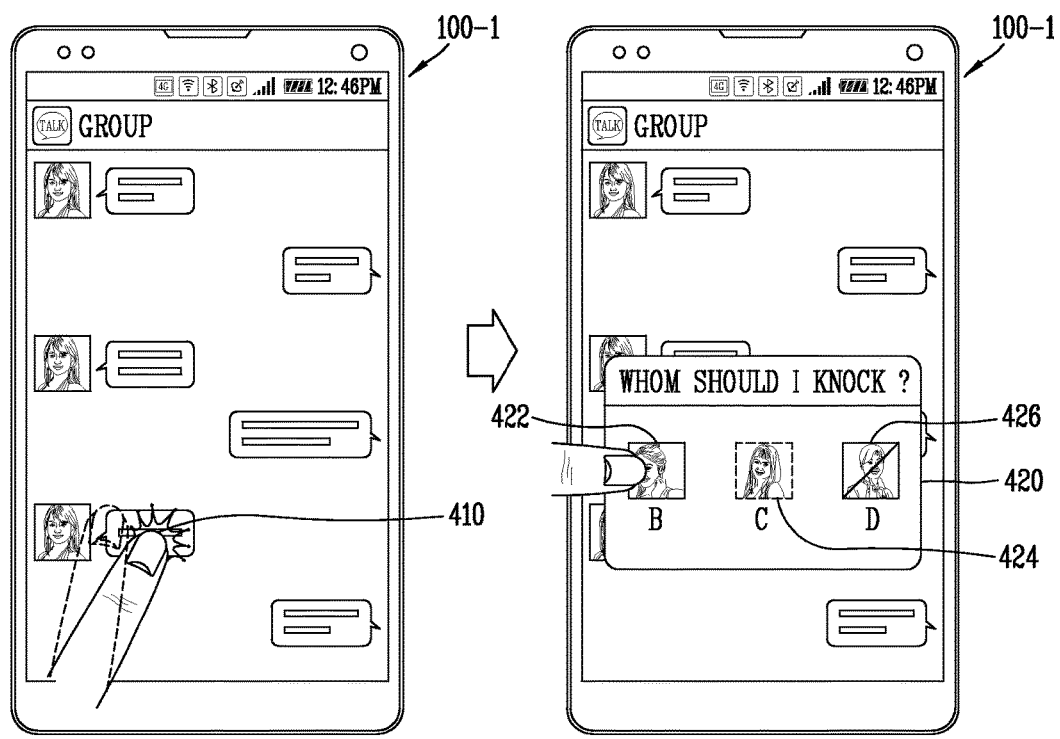
FIG. 4 is a conceptual view illustrating an embodiment of a user interface transmitting a check request message according to the present disclosure.

FIG. 4 is a conceptual view illustrating an embodiment of a user interface transmitting a check request message (or transmitting a knock) according to the present disclosure.

Referring to FIG. 4, the user may select a specific message desired to request checking in a messenger chat room.

Specifically, the user may apply a tap input (knock) to a region 410 displayed with a specific message desired to request checking in a messenger chat room with a plurality of users to select a specific message.

For another embodiment, the user may apply a long touch or short touch to the region 410 displayed with a specific message desired to request checking to select a specific message.

Referring to FIG. 4, the user may select a user terminal (one of B, C and D) to which a check request message for requesting the checking of the selected specific message is transmitted. To this end, icons 422, 424, 426 corresponding to user terminals (B, C, D), respectively, are displayed.

Specifically, a pop-up window 420 containing icons 422, 424, 426 corresponding to user terminals (B, C, D), respectively, may be displayed on the messenger chat room.

At this time, an icon corresponding to a terminal (A) of a creator of the selected specific message or his or her own user terminal 100-1 may not be displayed on the pop-up window 420. Furthermore, an icon 424 corresponding to a user terminal (C) that has already checked the selected specific message may not be displayed thereon.

On the other hand, the icons 422, 424, 426 may be displayed along with different image effects according to whether or not the user terminal (B, C, D) has checked the selected specific message.

For an embodiment, an icon 422 corresponding to the user terminal (B) that has not yet checked the selected specific message may be displayed with a solid line. On the contrary, an icon 424 corresponding to the user terminal (C) that has already checked the selected specific message may be displayed with a dotted line.

Furthermore, an icon 426 corresponding to the user terminal (D) that has not yet checked the selected specific message but has already received a check request message of the selected specific message may be displayed with a slashed or dark image effect. Accordingly, the user may intuitively know whether or not the selected specific message has been checked for each user terminal (B, C, D).

Subsequently, the user may touch and select the icon 422 corresponding to the user terminal (B) that will receive the selected specific message.

Furthermore, icons 424, 426 displayed along with a specific image effect may be selected using a user's touch input. In other words, it may be selected as a user terminal that will receive a check request message regardless of whether or not a dialog has been already checked in the user terminal (C) or a check request message has been transmitted to the user terminal (D). It is because there exists a possibility that the actual user of the terminal (C) has not read a dialog even when determined that the dialog has been checked in the user terminal (C).

Furthermore, the user terminal (D) may have received a check request message from any user terminal (A, B, C) 100-1. For example, the user terminal (D) may already have received a check request message of the specific message from his or her own user terminal 100-1.

Figure 5:
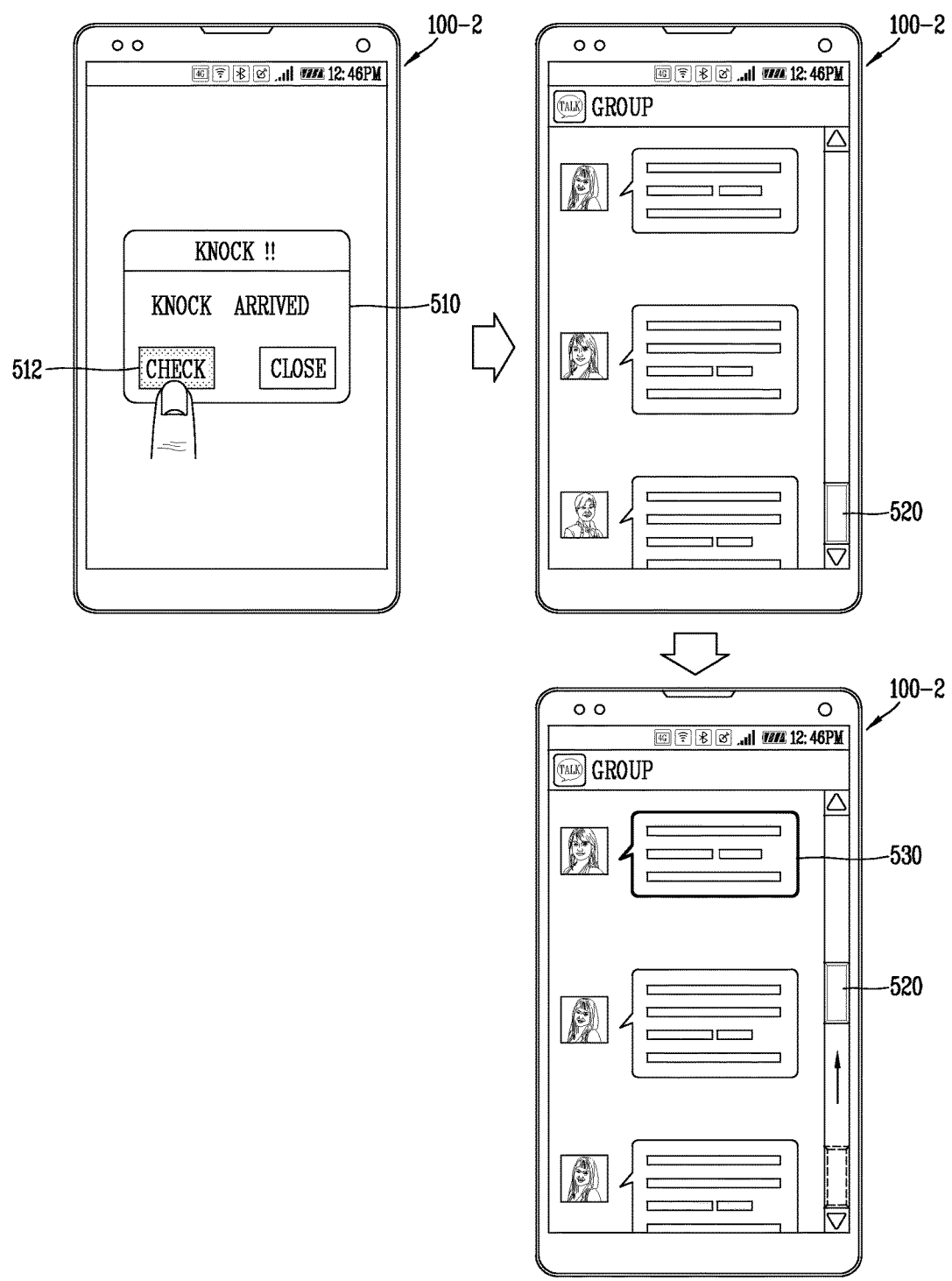
FIG. 5 is a conceptual view illustrating an embodiment of a user interface receiving a check request message according to the present disclosure.

FIG. 5 is a conceptual view illustrating an embodiment of a user interface receiving a check request message (or receiving a knock) according to the present disclosure.

In other words, it is a conceptual view illustrating a user interface in which the user selects a terminal (B) 100-2 to receive a check request message of the selected specific message in FIG. 4.

Referring to FIG. 5, a check request message may be displayed as a pop-up window 510, and a check icon 512 for checking the selected specific message contained in a region 510 displayed with the check request message may be selected using a touch input.

Referring to FIG. 5, the message dialog window of a messenger chat room in FIG. 4 is displayed. At this time, most recently transmitted and received messages are displayed on an initially displayed message dialog window, and thus a scroll bar 520 of the message dialog window is located at the bottom side of the message dialog window.

On the contrary, messages prior to the received time of the most recently checked message may be displayed on the initially displayed message dialog window, and in this case, the scroll bar 520 of the message dialog window may be located at any position above the bottom side of the message dialog window.

Referring to FIG. 5, an automatic scroll input is applied to display the selected specific message on a message dialog window that has been displayed as shown in the second figure of FIG. 5.

Specifically, the scroll bar 520 may be moved upward until the selected specific message is displayed in the middle of the message dialog window.

For another embodiment, the scroll bar 520 may be moved upward to the upper side until the selected specific message is displayed in the middle of the message dialog window.

In other words, the scroll bar 520 may be moved from a location of the initially displayed message dialog window to a location at which the selected specific message is displayed.

Furthermore, an image effect distinguished from a region displayed with a message other than the selected specific message may be displayed in the region 410 displayed with the selected specific message.

For example, the edge of a dialog balloon 530 displayed with the selected specific message may be displayed in a dark color as shown in the third figure of FIG. 5, and the size of the dialog balloon 530 may be further increased or the characters of the specific message may be displayed in a larger size.

For another embodiment, the dialog balloon 530 displayed with the selected specific message or the edge thereof may be expressed with a blinking neon sign effect, and an indicator or icon indicating the selected specific message may be displayed around the dialog balloon 530 displayed with the selected specific message.

Figure 6A:
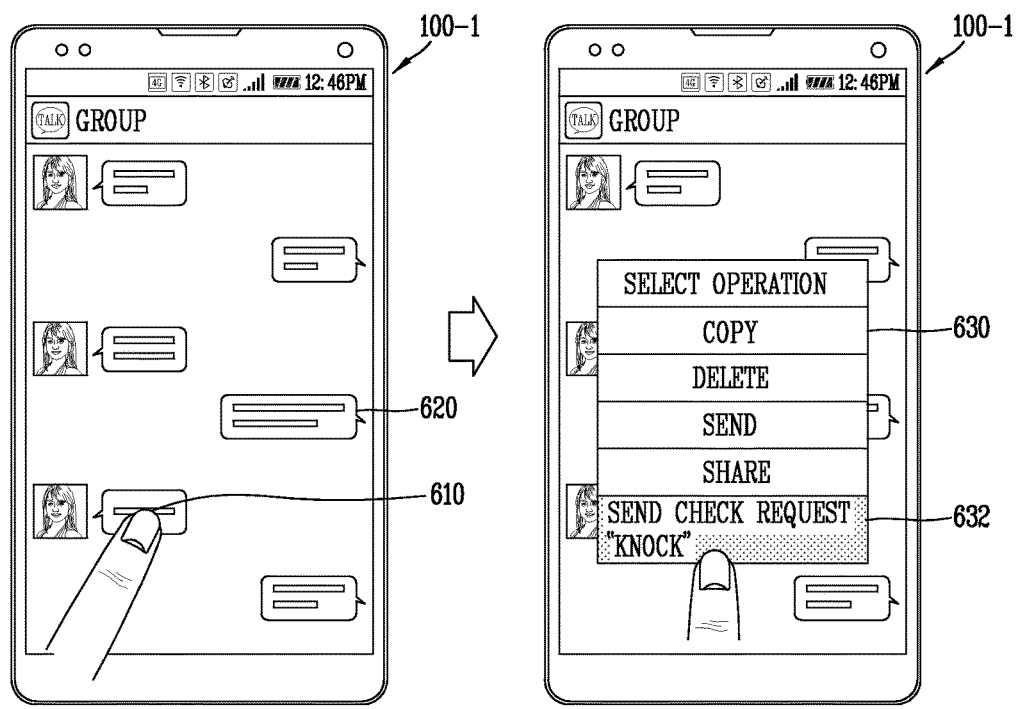
FIG. 6A and FIG. 6B are conceptual views illustrating embodiments of a user interface for selecting a specific message desired to be checked in a user terminal transmitting a check request message.
Figure 6B:
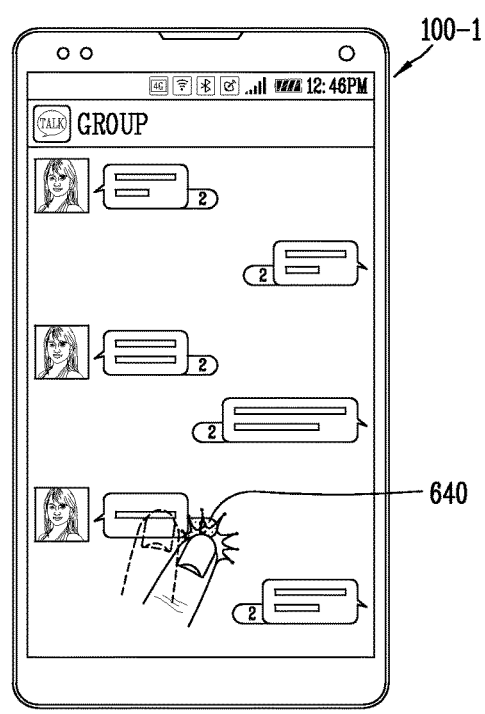

FIG. 6A and FIG. 6B are conceptual views illustrating embodiments of a user interface for selecting a specific message desired to be checked in a user terminal transmitting a check request message.

Referring to FIG. 6A, the user may apply a touch input such as a long touch, a short touch, a tap touch or the like to a region 610 displayed with a specific message desired to request checking in a messenger chat room to select the specific message.

Accordingly, a specific message may be selected, and icons corresponding to user terminals that can receive a check request message of the specific message may be displayed (refer to FIG. 4 and the related description thereof).

According to the embodiment, the user may select a message written by another user as well as a message written by himself or herself, and transmit a check request message of the selected message to the user's desired terminal.

Specifically, the user may touch a region 620 displayed with a message written in his or her own user terminal 100-1 to select the message written by himself or herself or touches a region 610 displayed with a message written in another user terminal (A) to select it.

Referring to FIG. 6A, a pop-up window 630 associated with the selection of a subsequent control command may be displayed according to a long touch input in FIG. 6A.

Accordingly, when the user touches a list 632 corresponding to the transmission of a check request message to select one, icons corresponding to user terminals that can receive a check request message of the selected specific message may be displayed (refer to FIG. 4 and the related description thereof).

Referring to FIG. 6B, the user may apply a tap input to an icon 640 indicating the number of persons who have not read a specific message desired to request checking in the messenger chat room to select the specific message.

For another embodiment, the user may apply a long touch or short touch input to the icon 640 indicating the number of persons who have not read a specific message desired to request checking in the messenger chat room to select the specific message.

Similarly, a specific message may be selected, and icons corresponding to user terminals that can receive a check request message of the specific message may be displayed (refer to FIG. 4 and the related description thereof).

FIGS. 7A through 8C are conceptual views illustrating embodiments of a user interface for selecting a user terminal that will receive a check request message in a user terminal transmitting the check request message.

Figure 7A:
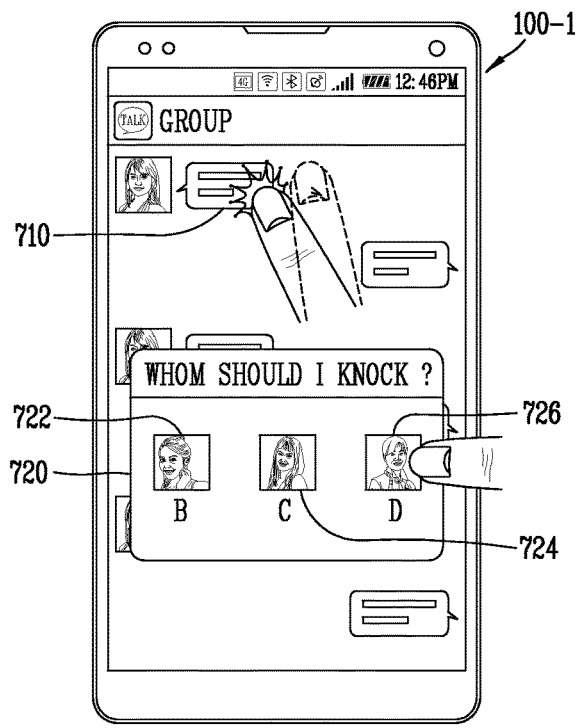
FIGS. 7A, 7B, 7C, 7D, 8A, 8B and 8C are conceptual views illustrating embodiments of a user interface for selecting a user terminal that will receive a check request message in a user terminal transmitting the check request message.

Referring to FIG. 7A, a tap input may be applied to a region 710 displayed with a specific message desired to check by another user to select a specific message.

Accordingly, a pop-up window 720 containing icons 722, 724, 726 corresponding to user terminals (B, C, D), respectively, may be displayed at a lower side of the region 710 displayed with the selected specific message.

At this time, an icon corresponding to a terminal (A) of a creator of the selected specific message or his or her own user terminal 100-1 may not be displayed on the pop-up window 720. Furthermore, an icon corresponding to a terminal that has already checked the selected specific message may not be displayed thereon.

Furthermore, when the user touches and selects an icon 726 corresponding to a user terminal (D) that will receive a check request message, the check request message may be transmitted to the relevant user terminal (D).

Figure 7B:
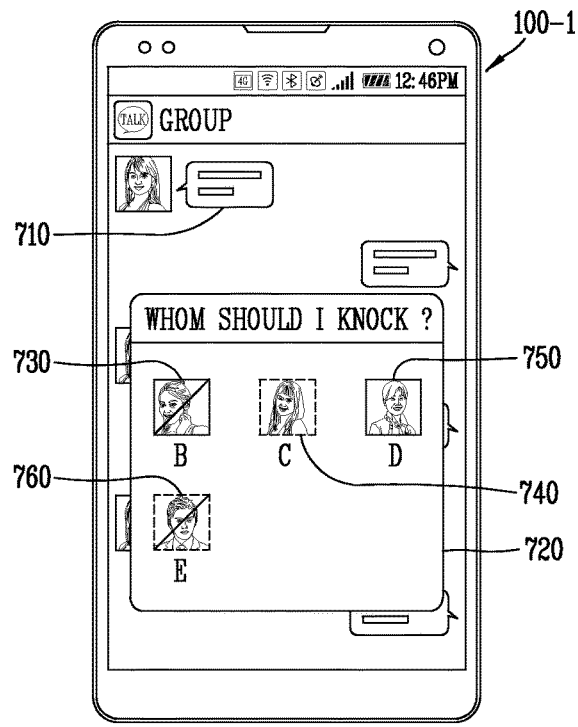

Referring to FIG. 7B, each icon 703, 740, 750, 760 corresponding to the user terminal (B, C, D, E) may be displayed along with a different image effect according to whether or not the user terminal (B, C, D, E) has checked a specific message.

For an embodiment, the icon 730 corresponding to the user terminal (B) that has not checked a specific message but has already received a check request message may be displayed with a solid line. At this time, symbol "/" may be displayed within the icon 730.

For another embodiment, the icon 740 corresponding to the user terminal (C) that has checked a specific message but has not received a check request message may be displayed with a dotted line.

For another embodiment, the icon 750 corresponding to the user terminal (D) that has not checked a specific message and has not received a check request message may be displayed with a solid line.

For another embodiment, the icon 760 corresponding to the user terminal (E) that has checked a specific message but has not received a check request message may be displayed with a dotted line. At this time, symbol "/" may be displayed within the icon 760.

According to the embodiment, the user may intuitively know whether or not the selected specific message has been checked for each user terminal (B, C, D, E).

On the other hand, a user terminal that will receive a check request message may be selected regardless of whether or not conversation has been already checked in the user terminal or a check request message has been transmitted to the user terminal. It is because there exists a possibility that a user of the user terminal (C) has not read a dialog in actuality even when determined that the dialog has been checked in the user terminal (C).

Furthermore, it is not necessarily required that the check request message is received from his or her own user terminal 100-1. For example, user terminal "B" may have already received a check request message of the specific message from user terminal "C".

Subsequently, when the user touches and selects the icon 750 corresponding to the user terminal (D) that will receive a check request message, a check request message may be transmitted to the relevant user terminal (D).

Figure 7C:
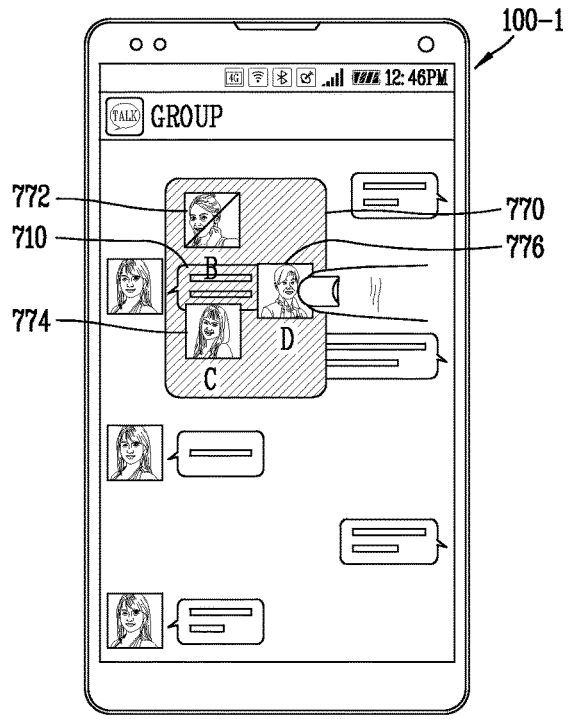

Referring to FIG. 7C, icons 772, 774, 776 corresponding to user terminals (B, C, D) may be displayed in the surrounding region 770 of a region 710 displayed with a specific message selected by a tap input.

Accordingly, when the user touches and selects the icon 776 corresponding to the user terminal (D) that will receive a check request message, a check request message may be transmitted to the relevant user terminal (D).

Figure 7D:
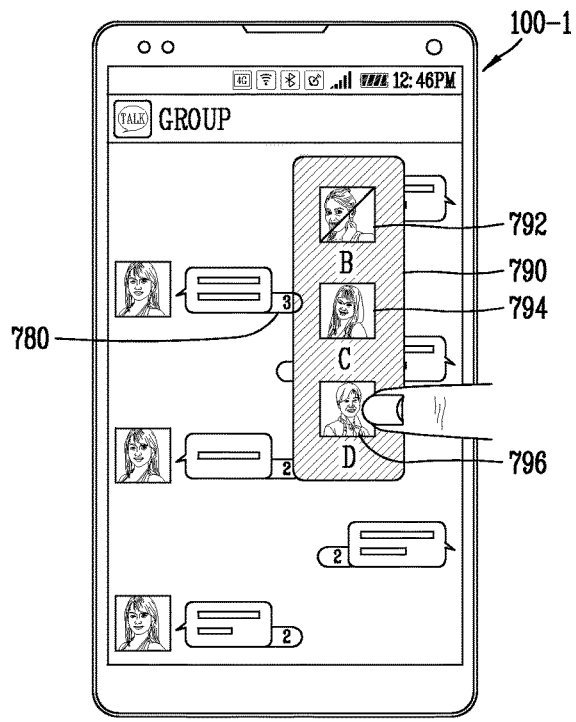

Referring to FIG. 7D, icons 792, 794, 796 corresponding to user terminals (B, C, D) may be displayed in the surrounding region 790 of an icon 780 indicating the number of persons who have not read a specific message selected by a tap input.

Accordingly, when the user touches and selects the icon 796 corresponding to the user terminal (D) that will receive a check request message, a check request message may be transmitted to the relevant user terminal (D).

For another embodiment, referring to FIG. 8A, when applying a long touch to a region 810 displayed with a specific message, a pop-up window 820 containing icons corresponding to user terminals (B, C, D) may be displayed below the region 810 displayed with the specific message.

Subsequently, the user may apply a drag input to an icon 822 corresponding to one user terminal (D) of the displayed icons to select the user terminal (D) desired to transmit a check request message.

Figure 8A:
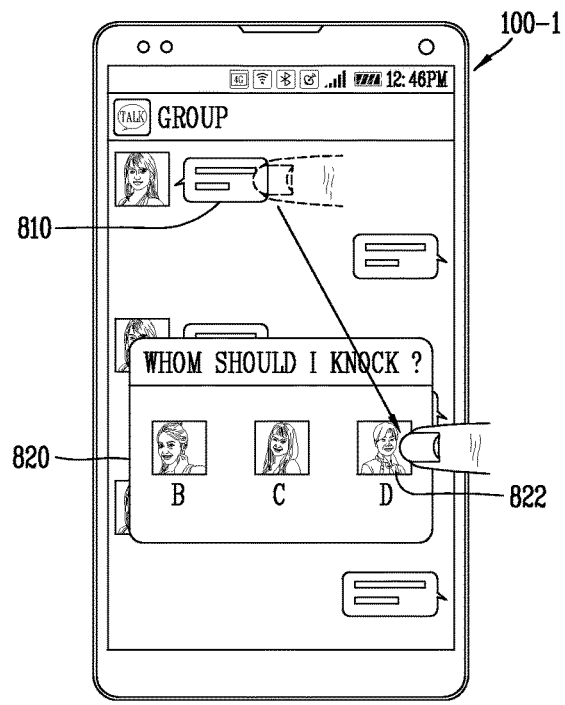
Figure 8B:
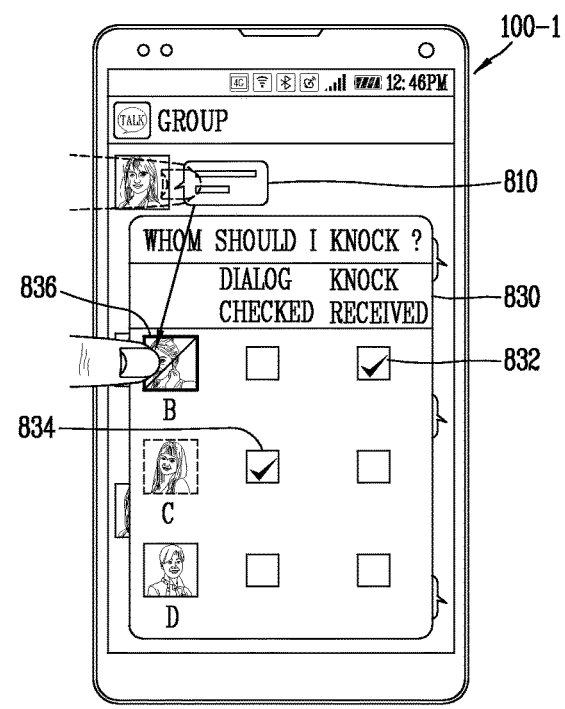

Referring to FIG. 8B, when applying a long touch to a region 810 displayed with a specific message, a pop-up window 830 indicating whether or not the specific message has been checked and whether or not the check request message has been received in each user terminal (B, C, D) may be displayed.

Specifically, when the specific message has been checked or the check request message has been received (knock received), a check indicator may be displayed in the relevant check box.

For example, a check indicator is displayed in the knock received check box 832 of the user terminal (B), and thus it is seen that a knock has been transmitted to the user terminal (B).

For another embodiment, a check indicator is displayed in the dialog checked check box 834, and thus it is seen that the specific message has been checked in the user terminal (C).

For another embodiment, a check indicator is not displayed in the dialog checked check box and knock received check box of user terminal "D". Through this, it is seen that the specific message has not been checked and the knock has not been received in user terminal "D".

According to the embodiment, it is clearly seen whether or not the specific message has been checked and whether or not the knock has been received in the user terminals (B, C, D), respectively.

Subsequently, the user may apply a drag input to an icon 836 corresponding to one user terminal (B) of the displayed icons to select the user terminal (B) desired to transmit a check request message.

Figure 8C:
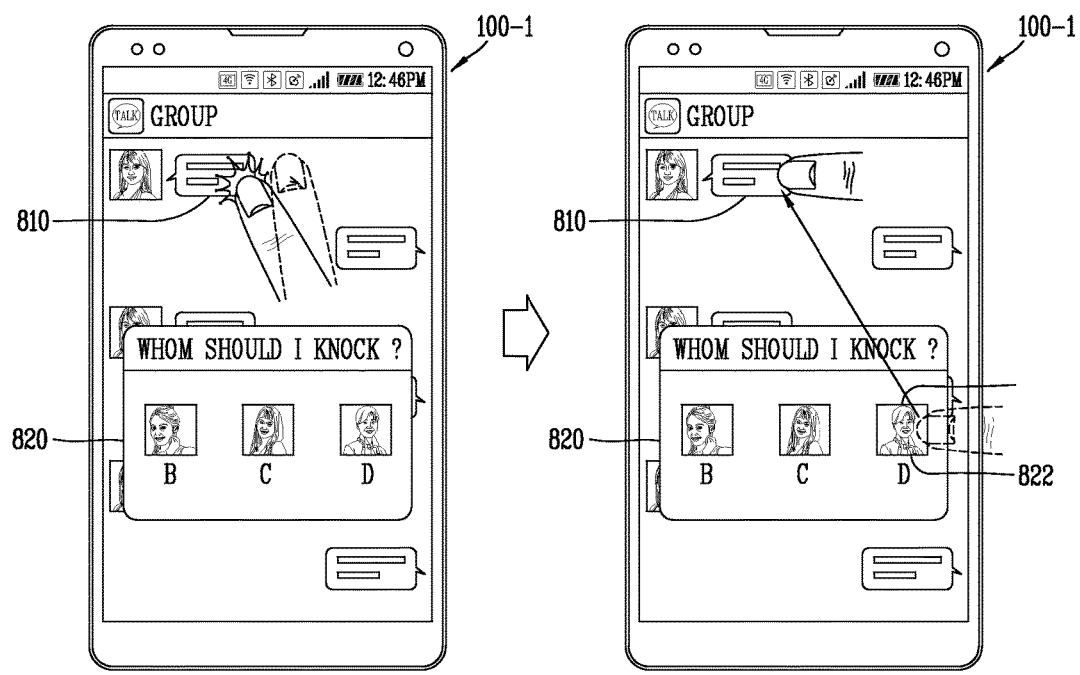

Referring to FIG. 8C, when a tap input is applied to a region 810 displayed with a specific message to select the relevant message, a pop-up window 820 containing icons corresponding to user terminals may be displayed at a lower side of the region 810 displayed with the specific message.

Subsequently, the user may drag one 822 of the icons contained in the pop-up window 820 to the side of the region 810 displayed with the specific message to select the user terminal (D) desired to transmit a check request message.

In other words, when dragging the icon 822 corresponding to the user terminal (D) desired to transmit a check request message to the side of the region 810 displayed with the specific message, a check request message may be transmitted to the relevant user terminal (D).

On the other hand, an additionally entered message may be transmitted to a user terminal corresponding to the selected icon along with the check request message.

FIGS. 9A through 11B are conceptual views illustrating embodiments of a user interface for entering an additional message that will be transmitted along with a check request message in a user terminal transmitting the check request message.

Figure 9A:
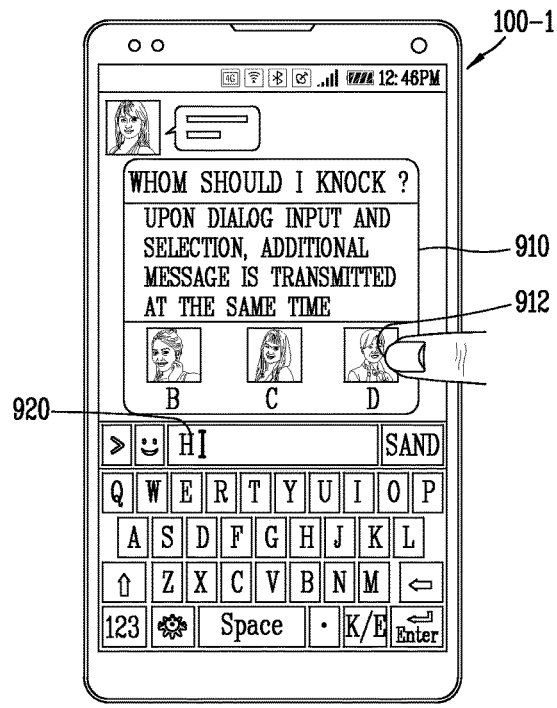
FIGS. 9A, 9B, 9C, 10A, 10B, 11A and 11B are conceptual views illustrating embodiments of a user interface for entering an additional message that will be transmitted along with a check request message in a user terminal transmitting the check request message.

Referring to FIG. 9A, a pop-up window 910 for entering an additional message prior to selecting a user terminal that will receive a check request message may be displayed.

Accordingly, when the user enters an additional message 920 and then touches and select an icon 912 corresponding to the user terminal (D), a check request message and the additionally message 920 may be concurrently transmitted to the relevant user terminal (D).

Figure 9B:
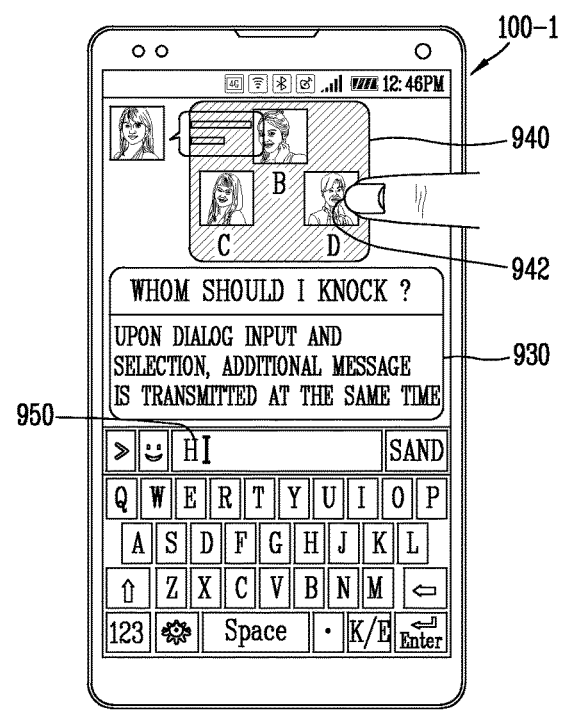

Referring to FIG. 9B, a pop-up window 930 for entering an additional message may be displayed at a lower side of a region 940 containing icons corresponding to user terminals (B, C, D).

Accordingly, when the user enters an additional message 950 and then touches and select an icon 942 corresponding to the user terminal (D), a check request message and the additionally message 950 may be concurrently transmitted to the relevant user terminal (D).

Figure 9C:
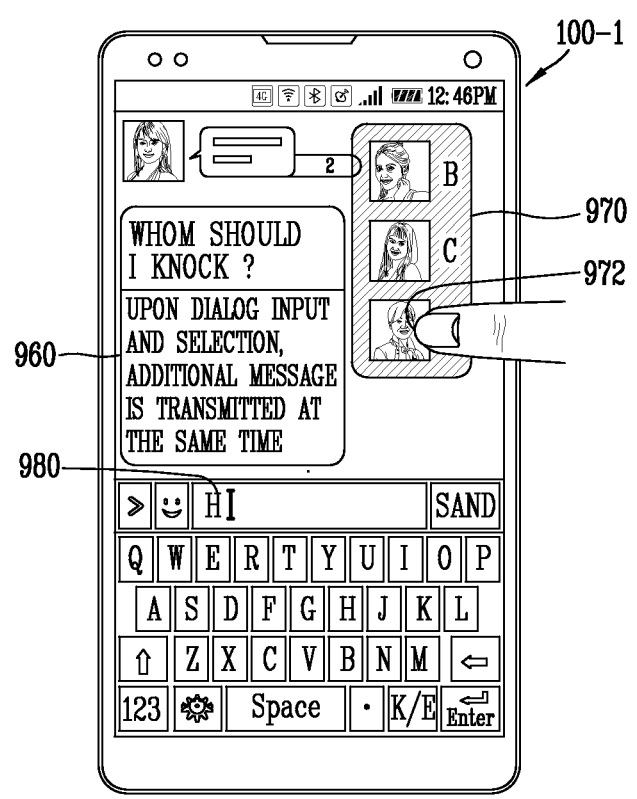

Referring to FIG. 9C, a pop-up window 960 for entering an additional message may be displayed adjacent to a region 970 containing icons corresponding to user terminals (B, C, D).

Accordingly, when the user enters an additional message 980 and then touches and select an icon 972 corresponding to the user terminal (D), a check request message and the additionally message 980 may be concurrently transmitted to the relevant user terminal (D).

Figure 10A:
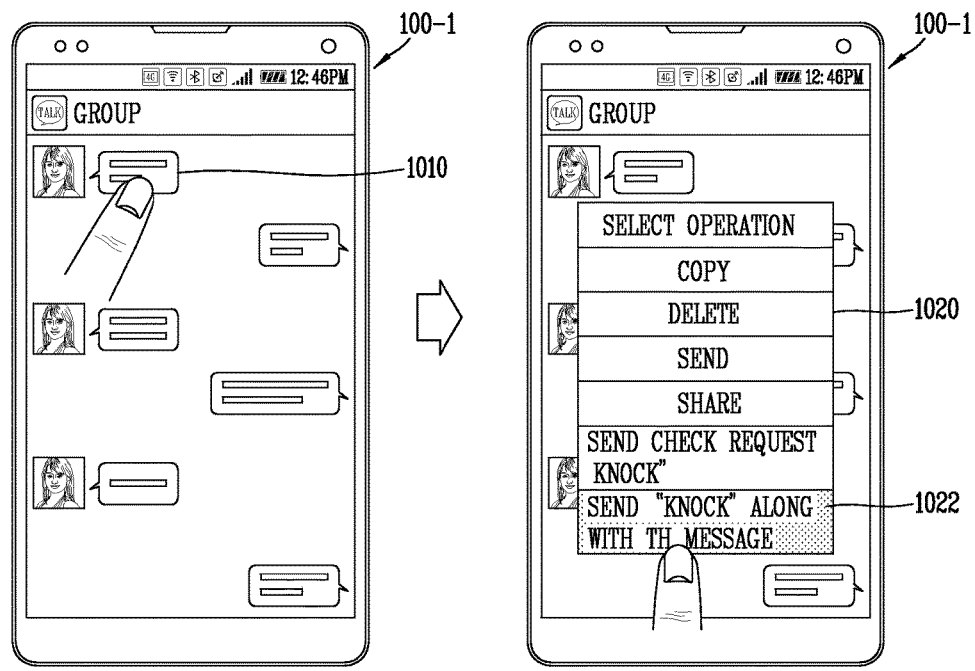

For another embodiment, referring to FIG. 10A, when applying a long touch to a region 1010 displayed with a specific message desired to request checking as illustrated in FIGS. 6A and 6B, a pop-up window 1020 associated with the selection of a subsequent control command may be displayed.

Accordingly, when the user touches and selects a list 1022 corresponding to the transmission of a check request message along with an additional message, a keyboard for entering the additional message may be displayed.

For another embodiment, when the user touches and selects a list 1022 corresponding to the transmission of a check request message along with an additional message, a user interface for selecting a user terminal may be displayed subsequent to entering an additional message illustrated in FIG. 9.

Figure 10B:
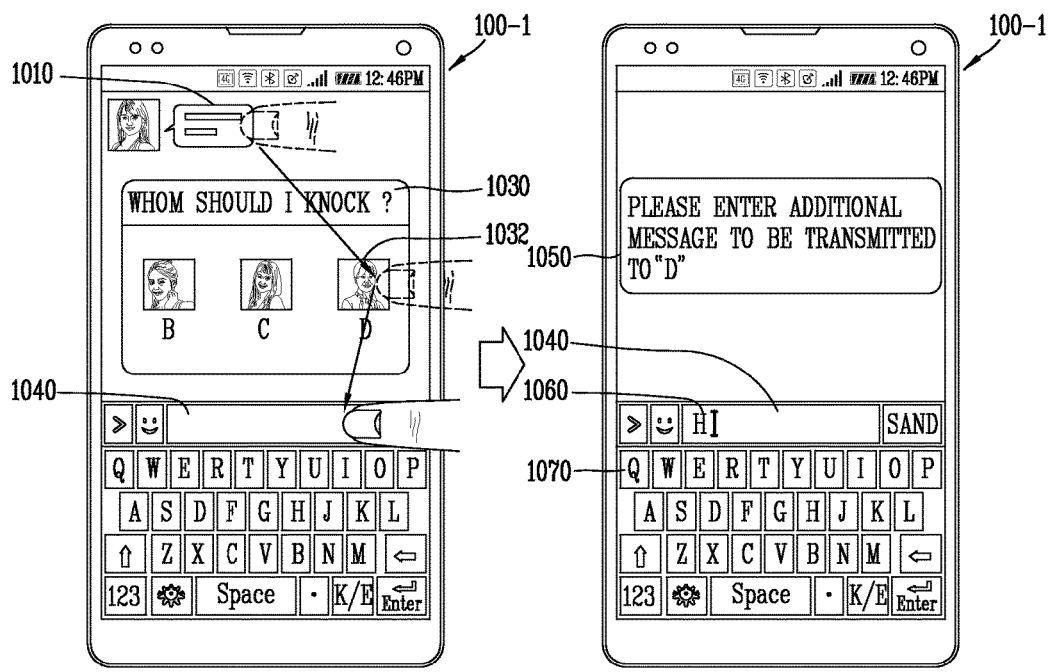

Referring to FIG. 10B, when applying a long touch to a region 1010 displayed with a specific message as illustrated in FIG. 8A, a pop-up window 1030 containing icons corresponding to user terminals (B, C, D) may be displayed below the region 1010 displayed with the specific message.

Subsequently, the user may apply a drag input to an icon 1032 corresponding to one user terminal (D) of the displayed icons to select the user terminal (D) desired to transmit a check request message.

Next, the user may apply a drag input from the icon 1032 corresponding to the user terminal (D) to a message input window 1040 for entering an additional message to enter the additional message.

Specifically, a keyboard 1070 for entering an additional message may be displayed according to a drag input to the message input window 1040. At this time, a message 1050 with the content of entering an additional message to be transmitted to the selected user terminal (D) may be displayed.

Accordingly, the user may enter an additional message 1060 to the message input window 1040. As a result, a check request message and the additional message 1060 may be transmitted to the selected user terminal (D).

Figure 11A:
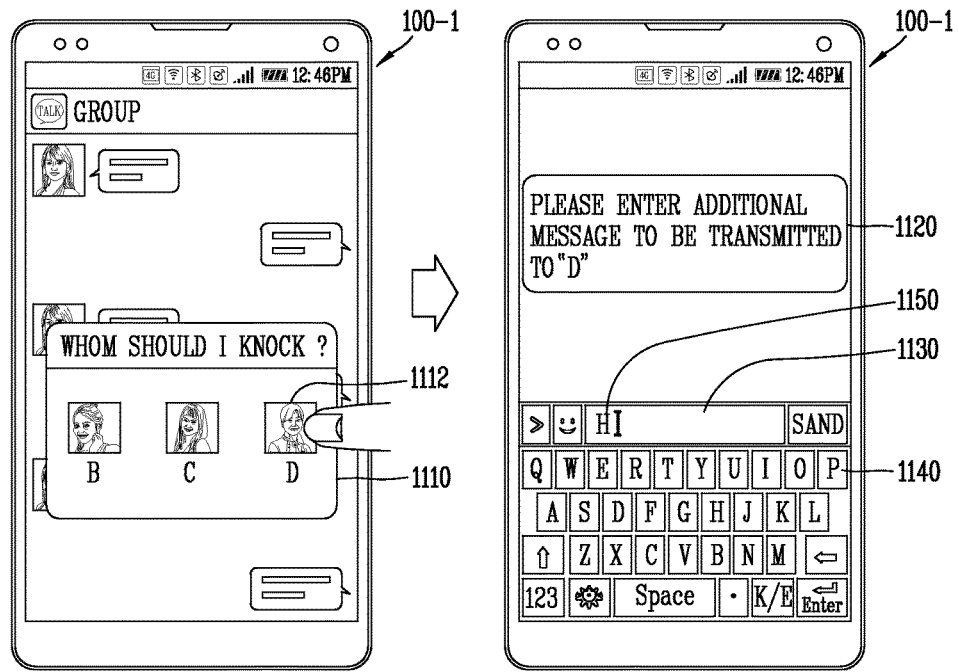

For another embodiment, referring to FIG. 11A, a pop-up window 1110 for selecting a user terminal that will receive a check request message as illustrated in FIG. 7A may be displayed. Subsequently, when the users applies a long touch to an icon 1112 corresponding to the user terminal (D), the relevant user terminal (D) may be selected as a terminal that will receive the check request message.

Furthermore, a message input window 1030 and a message input keyboard 1140 for entering an additional message may be displayed. At this time, a pop-up window 1120 with the content of entering an additional message to be transmitted to the user terminal (D) may be displayed at the same time.

Accordingly, when the user enters an additional message 1150 desired to be transmitted to the selected user terminal (D), a check request message of the specific message may be transmitted to the selected user terminal (D) along with the additional message 1150.

Figure 11B:
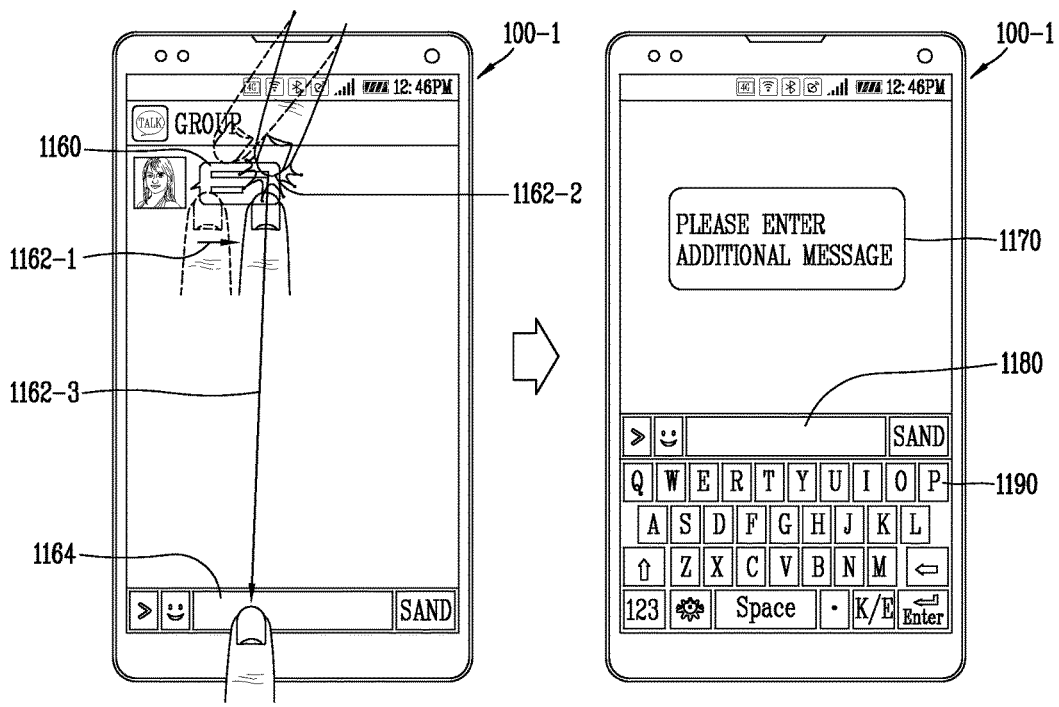

Referring to FIG. 11B, when applying a swipe input 1162-1 for rubbing a region 1160 displayed with a specific message or a plurality of tap inputs 1162-2, a message input window 1180 and a message input keyboard 1190 for entering an additional message may be displayed. At this time, a pop-up window 1170 with the content of entering an additional message may be displayed at the same time.

For another embodiment, when applying a drag input 1162-3 to a message input window 1164 subsequent to a double click or a plurality of tap inputs 1162-2, a message input window 1180 and a message input keyboard 1190 for entering an additional message may be displayed. At this time, a pop-up window 1170 with the content of entering an additional message may be displayed at the same time.

For another embodiment, when applying one of various inputs such as a swipe input 1162-1 for rubbing a region 1160 displayed with a specific message or a plurality of tap inputs 1162-2, a drag input 1162-3 to the message input window 1164 subsequent to a double click or the plurality of tap inputs 1162-2, and the like, a user interface as illustrated in FIG. 11A may be displayed.

In other words, when a message is selected using a specific input scheme, first, a user terminal that will receive a check request message may be selected, and then a user interface for entering an additional message may be displayed.

Figure 12:
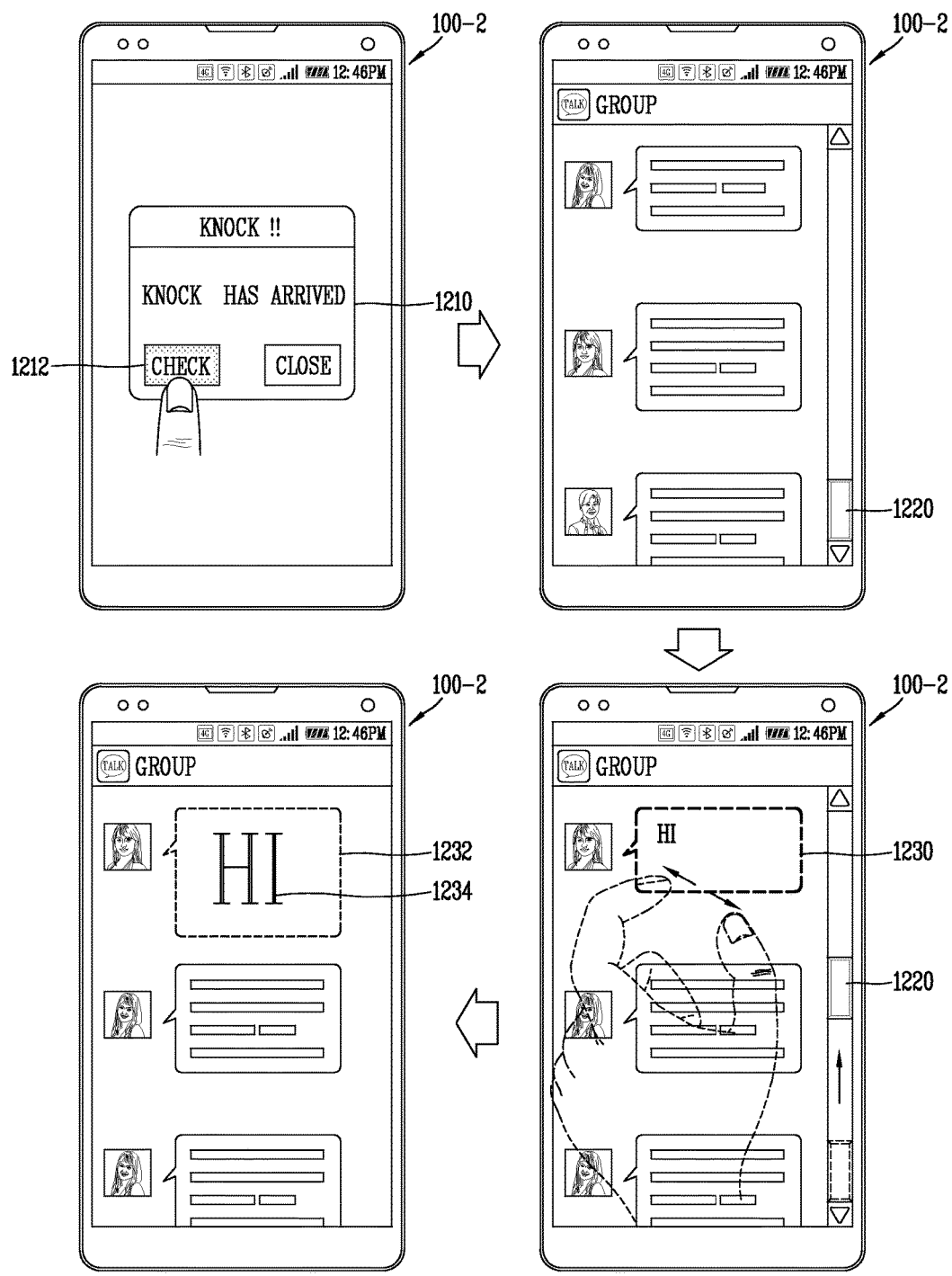
FIG. 12 is a conceptual view illustrating still another embodiment of a user interface receiving a check request message according to the present disclosure.

FIG. 12 is a conceptual view illustrating still another embodiment of a user interface receiving a check request message (receiving a knock) according to the present disclosure.

In other words, it is a conceptual view illustrating a user interface of the terminal 100-2 selected to receive a check request message of the selected specific message.

Referring to FIG. 12, a check request message may be displayed on a pop-up window 1210, and a check icon 121 for the checking of the selected specific message contained in the region 1210 displayed with the check request message may be selected using a touch input as illustrated in FIG. 5.

Referring to FIG. 12, a message dialog window of the messenger chat room that has transmitted and received the selected specific message is displayed as illustrated in FIG. 5. At this time, At this time, most recently transmitted and received messages are displayed on an initially displayed message dialog window, and thus a scroll bar 1220 of the message dialog window is located at the bottom side of the message dialog window.

On the contrary, messages prior to the received time of the most recently checked message may be displayed on the initially displayed message dialog window, and in this case, the scroll bar 1220 of the message dialog window may be located at any position above the bottom side of the message dialog window.

Referring to FIG. 12, an automatic scroll input is applied until the selected specific message is displayed on a message dialog window that has been displayed in FIG. 12.

Specifically, the scroll bar 1220 may be moved upward until the selected specific message is displayed in the middle of the message dialog window.

For another embodiment, the scroll bar 1220 may be moved upward to the upper side until the selected specific message is displayed in the middle of the message dialog window.

In other words, the scroll bar 1220 may be moved from a location of the initially displayed message dialog window to a location at which the selected specific message is displayed.

On the other hand, an image effect distinguished from a region displayed with a different message of the dialog window may be displayed in a region 1230 displayed with the selected specific message.

Specifically, the edge of a dialog balloon 1230 displayed with the selected specific message may be displayed in a blinking manner, and the size of the dialog balloon 1230 displayed with the selected specific message may be further increased or the characters of the specific message may be displayed in a larger size than those of the other messages displayed in the dialog window. Furthermore, an indicator or icon indicating the selected specific message may be displayed around the dialog balloon 1230 displayed with the selected specific message.

For another embodiment, the selected specific message may be displayed in a three-dimensional image. As a result, the user of the user terminal 100-2 that has received a check request message may easily check the content of the specific message.

Subsequently, the user may apply a pinch-out input to a region 1230 displayed with the selected specific message.

Referring to FIG. 12, a region 1232 displayed with the selected specific message may be displayed in an enlarged manner according to the user's pinch-out input. In other words, according to the user's consecutive pinch-out input, the region 1232 and characters 1234 displayed with the selected specific message may be displayed in an enlarged manner.

Figure 13A:
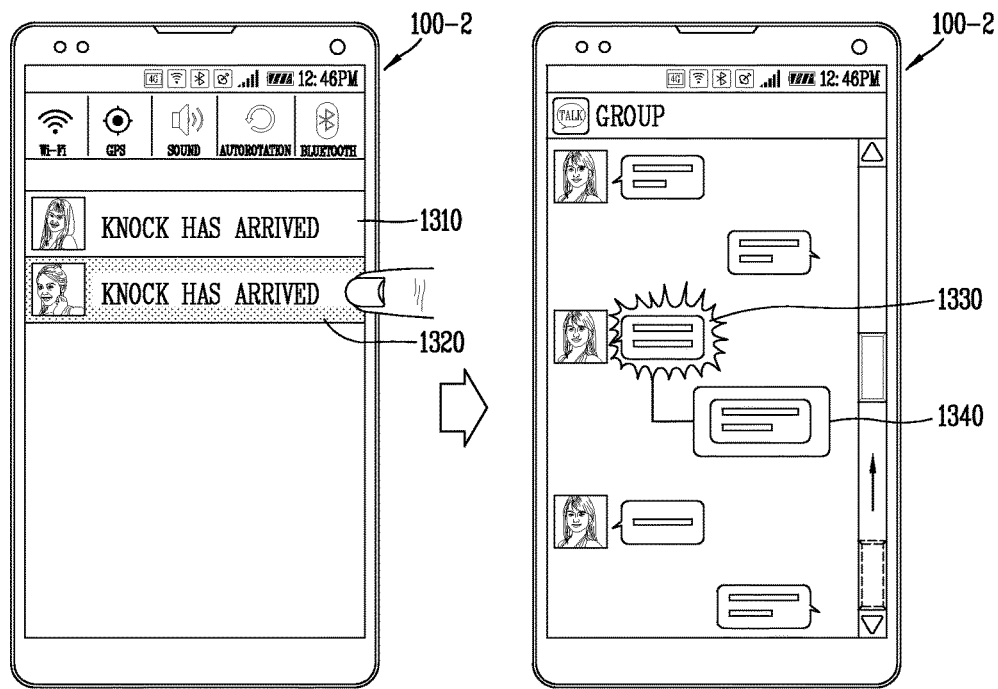
FIG. 13A and FIG. 13B are conceptual views illustrating embodiments of a user interface at which a check request message is received along with an additional message in a user terminal receiving the check request message.
Figure 13B:
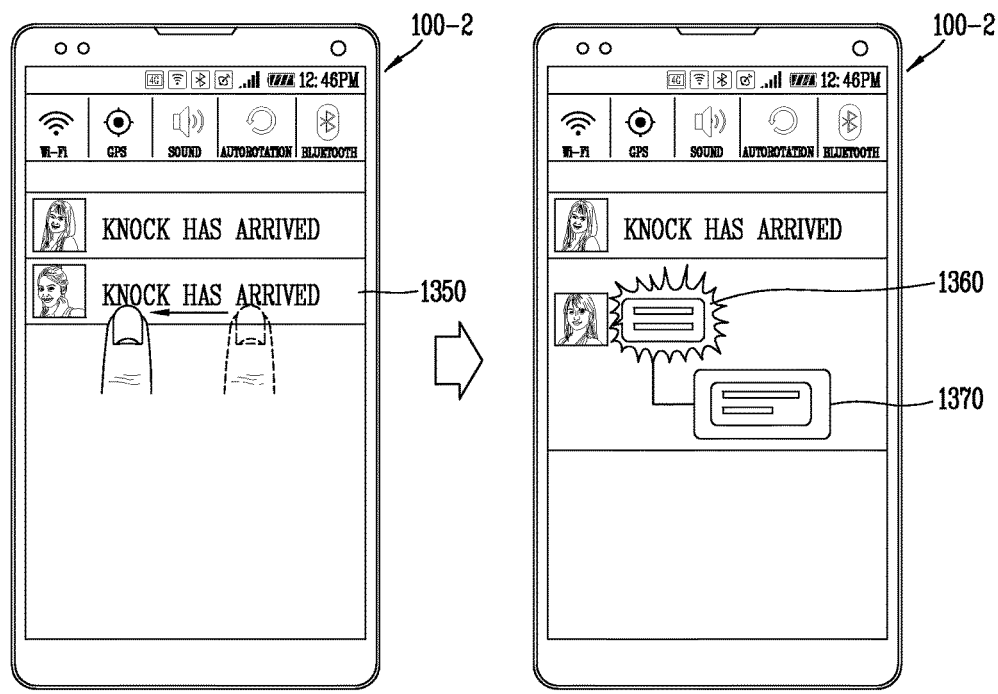

FIG. 13A and FIG. 13B are conceptual views illustrating embodiments of a user interface at which a check request message is received along with an additional message in a user terminal receiving the check request message.

Referring to FIG. 13A, the received check request message may be displayed on the status bar of the user terminal 100-2.

For an embodiment, the check request message may be displayed in consideration of both the selected specific message and a user terminal that has transmitted it.

Specifically, when a check request message of the first message has been transmitted from a first and a second user terminal, two check request messages can be displayed. Similarly, when check request messages of the first and the second message have been transmitted from a first user terminal, two check request messages can be displayed.

Subsequently, the user may apply a touch input to a region 1320 displayed with the check request message to select it.

Referring to FIG. 13A, a message dialog window in which the selected check request message has been transmitted and received is displayed as illustrated in FIG. 12, and an automatic scroll input may be applied to the dialog window to display a specific message requiring checking on the screen.

Specifically, an automatic scroll input may be applied to display a region 1330 displayed with the specific message at a specific position of the screen. Furthermore, the edge of the dialog balloon 1330 of the specific message may be displayed in a different shape from that of the dialog balloon of another message.

On the other hand, a message additionally received along with the check request message may be displayed along with the specific message.

Specifically, as illustrated in FIGS. 9A through 11B, an additional message entered in the user terminal 100-1 transmitting a check request message may be displayed adjacent to the specific message.

For example, a region 1340 displayed with the additional message may be located adjacent to a lower side of a region 1330 displayed with the specific message.

Referring to FIG. 13B, a slide input, a pinch-in or pinch-out input is applied to a region 1350 displayed with a check request message of the status bar, a specific message requiring checking may be displayed in the region 1350 displayed with the check request message.

Specifically, a region 1360 displayed with the specific message may be contained in the region 1350 displayed with the check request message. Furthermore, when there exists an additional message received along with the specific message, a region 1370 displayed with the additional message may be also contained in the region 1350 displayed with the check request message. At this time, the region 1370 displayed with the additional message may be located adjacent to the region 1360 displayed with the specific message.

On the other hand, when an icon transmitting a check acknowledgement message to a user terminal that has transmitted a check request message contained in a region displayed with the check request message is selected, a check acknowledgement message indicating that the message has been checked may be transmitted to the user terminal.

Figure 14A:
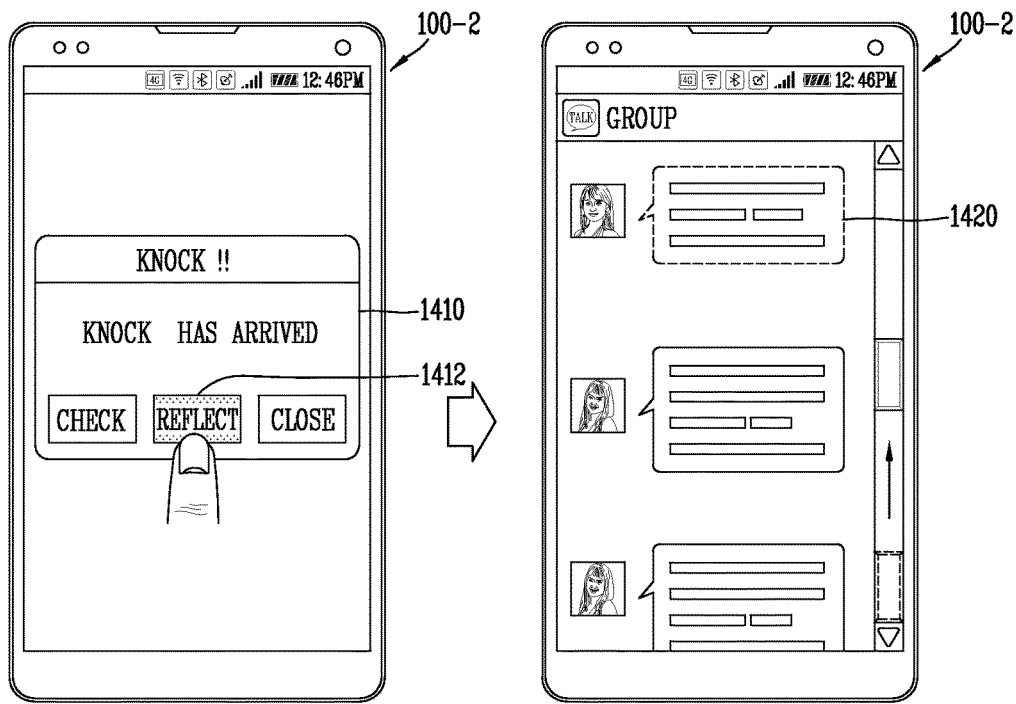
FIGS. 14A, 14B, 15A, 15B and 15C are conceptual views illustrating embodiments of a user interface of a user terminal that has transmitted a check request message and a user terminal that has received the check request message according to the selection of an icon transmitting a check acknowledgement message.
Figure 15A:
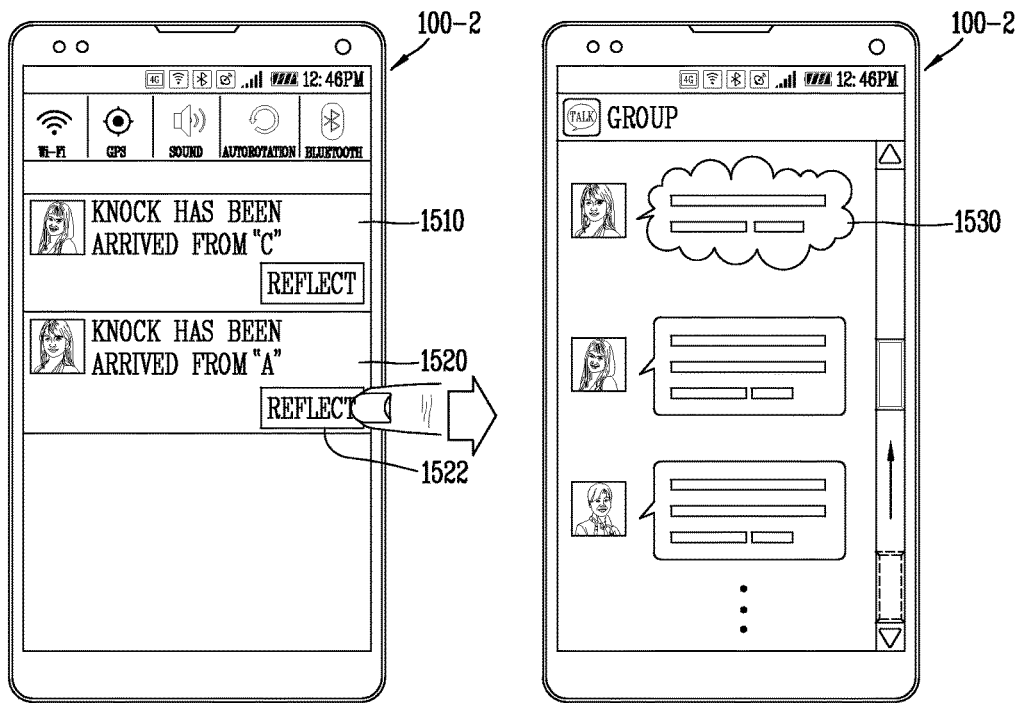
Figure 15B:
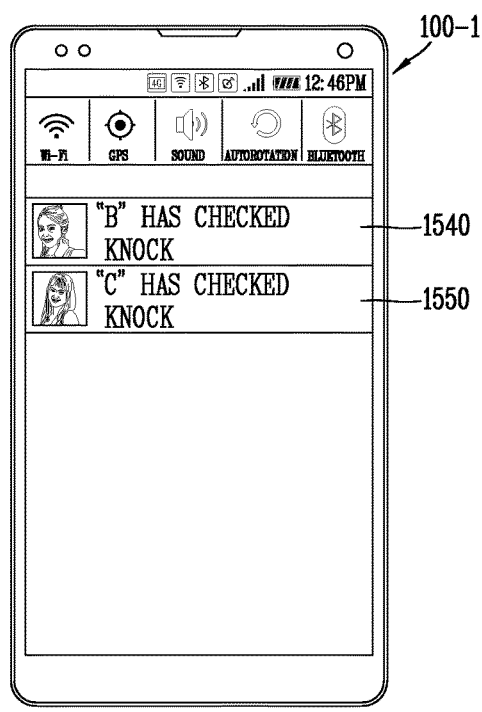
Figure 15C:
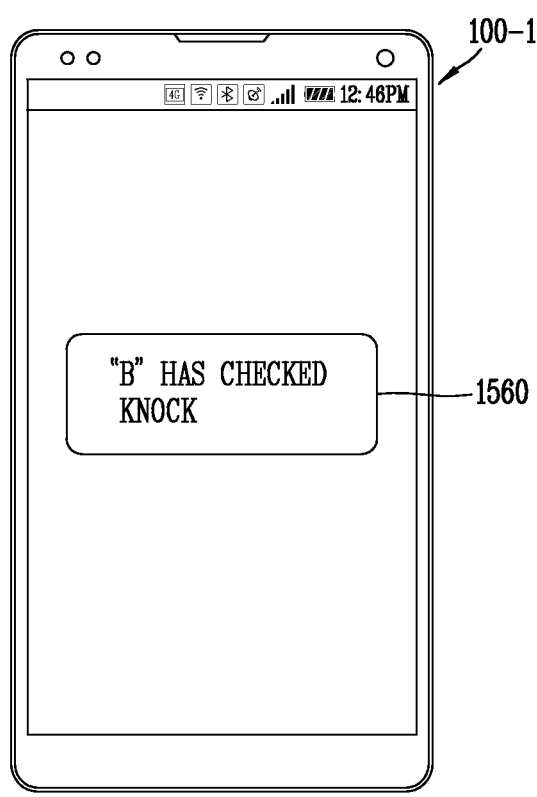

FIGS. 14A and 15C are conceptual views illustrating embodiments of a user interface of a user terminal that has transmitted a check request message and a user terminal that has received the check request message according to the selection of an icon transmitting a check acknowledgement message.

Referring to FIG. 14A, a check request message may be displayed as a pop-up window 1410, and a reflect icon 1412 contained in a region 1410 displayed with the check request message may be selected as a touch input.

The reflect icon 1412 is an icon corresponding to a control command for transmitting a message (check acknowledgement message) indicating that the specific message has been checked to a user terminal that has transmitted a check request message.

Referring to FIG. 14A, the message dialog window of a messenger chat room in which the selected specific message has been transmitted and received is displayed.

At this time, most recently transmitted and received messages are displayed on an initially displayed message dialog window, and thus an automatic scroll input may be applied to the message dialog window to display a region 1420 displayed with the selected specific message at the top side of the message dialog window.

Figure 14B:
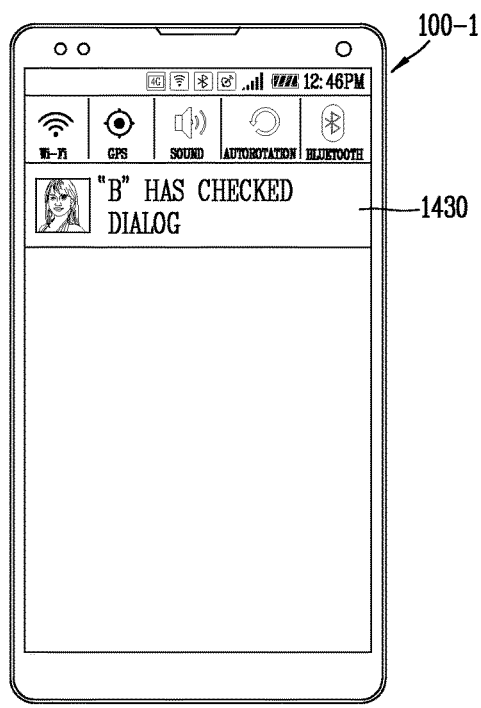

FIG. 14B is a conceptual view illustrating a user interface of the user terminal 100-1 that has transmitted a check request message.

Referring to FIG. 14B, a check acknowledgement message indicating that the specific message has been checked in the user terminal (B) 100-2 may be displayed in one region 1430 of the status bar of the user terminal 100-1 that has transmitted a check request message by the selection of the reflect icon 1412 in FIG. 14A.

For another embodiment, referring to FIG. 15A, the received check request messages may be displayed in a region 1510, 1520 of the status bar of the user terminal (B) 100-2. At this time, the user may touch and select a reflect icon 1522 contained in a region 1520 displayed with the check request message.

Referring to FIG. 15A, the message dialog window of a messenger chat room in which the selected specific message has been transmitted and received is displayed. At this time, most recently transmitted and received messages are displayed on an initially displayed message dialog window.

Accordingly, an automatic scroll input may be applied to the message dialog window to display a region 1530 displayed with the selected specific message at the top side of the message dialog window. Furthermore, the edge of the dialog balloon 1530 of the specific message may be displayed in a distinguished manner from the dialog balloon of the other messages of the dialog window.

Referring to FIG. 15B, a check acknowledgement message indicating that the specific message has been checked in the user terminal (B) 100-2 may be displayed in one region 1540 of the status bar of the user terminal (A) 100-1 that has transmitted a check request message to the user terminal (B) 100-2.

At this time, a check acknowledgement message received from another user terminal (C) may be displayed in one region 1530 of the status bar of the user terminal (A) 100-1.

Referring to FIG. 15C, a check acknowledgement message indicating that a specific message 1530 has been checked in the user terminal (B) 100-2 to the user terminal (A) 100-1 that has transmitted a check request message to the user terminal (B) 100-2 may be displayed as a pop-up window 1560.

Figure 16A:
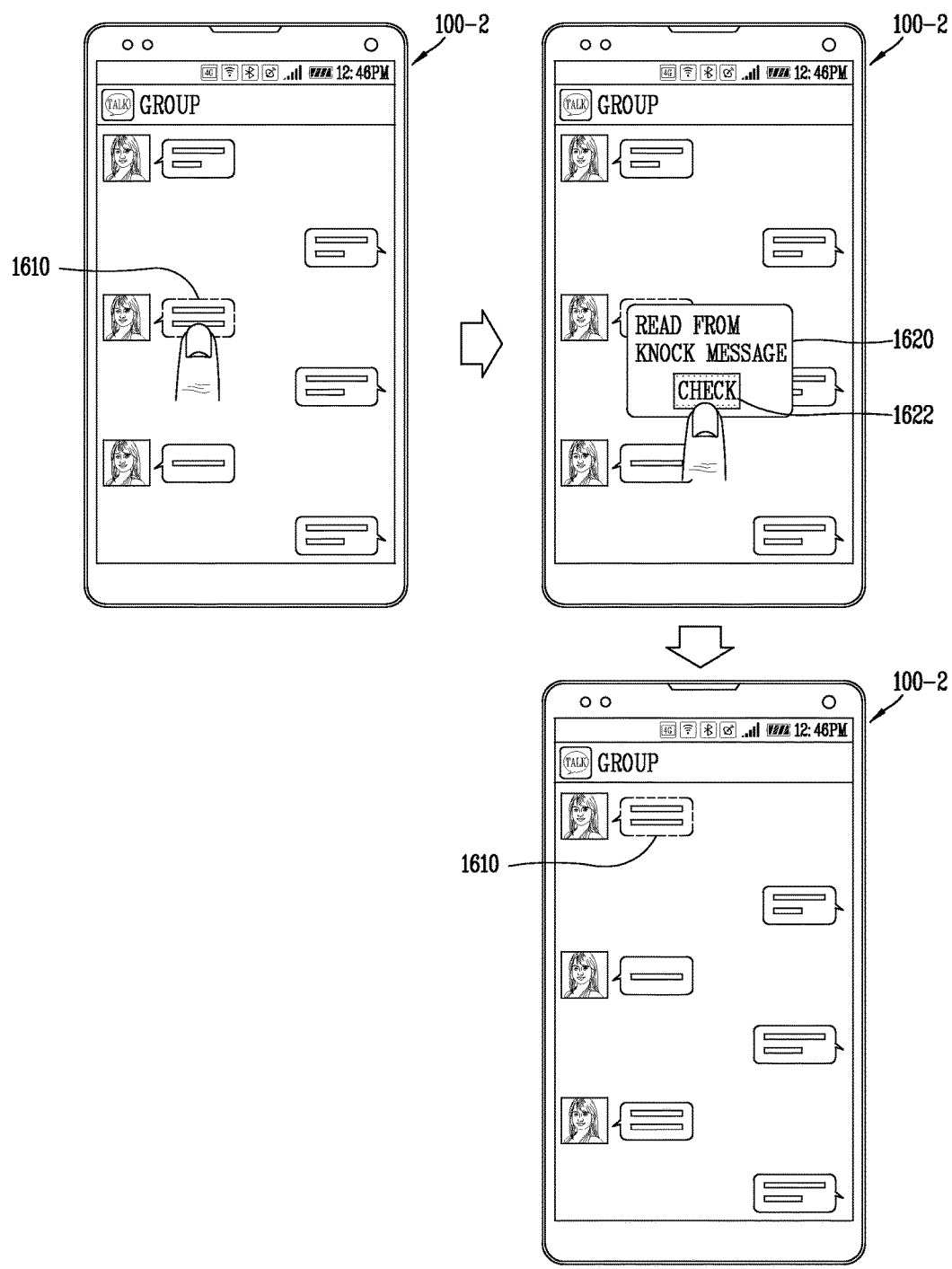
FIG. 16A and FIG. 16B are conceptual views illustrating embodiments of a user interface on which a checked specific message is displayed in a user terminal receiving a check request message.
Figure 16B:
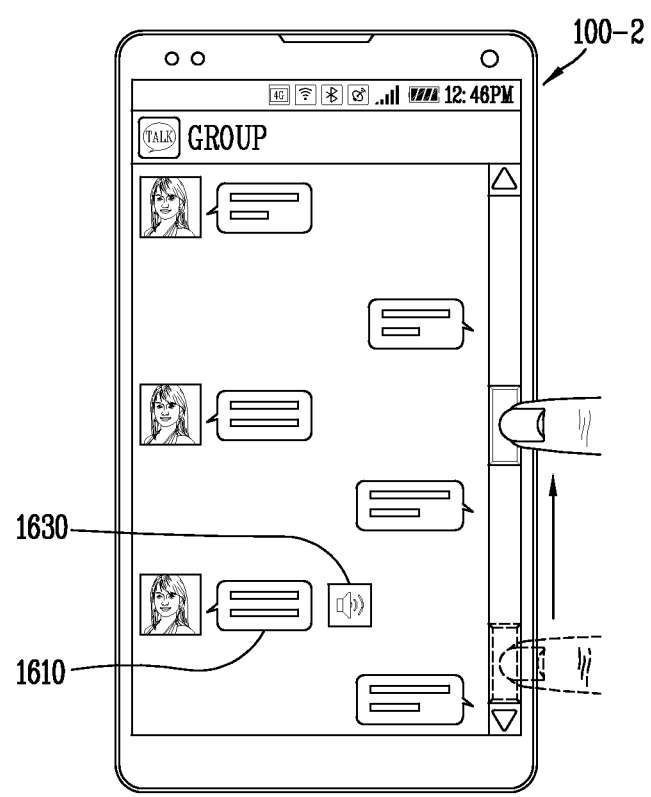

FIG. 16A and FIG. 16B are conceptual views illustrating embodiments of a user interface on which a checked specific message is displayed in a user terminal receiving a check request message.

Referring to FIG. 16A, according to the foregoing embodiments, an automatic scroll input may be applied to the message dialog window, a specific message may be displayed in a specific region of the message dialog window. Subsequently, a touch input may be applied to a region 1610 displayed with the selected specific message.

Referring to FIG. 16A, a pop-up window 1620 asking whether or not to display from a specific message (knocked message) may be displayed. Accordingly, the user may touch and select a check icon 1622 contained in the pop-up window 1620.

Referring to FIG. 16B, when the user executes another application, and then enters the relevant message chat room again (for example, when enters another message chat room and then enters the relevant message chat room again), a message dialog window may be displayed in a state that a region 1610 displayed with the specific message is displayed at the top side of the message dialog window. In other words, when entering the relevant chat room, the message dialog window may display from the knocked message other than recently transmitted and received messages.

For another embodiment, referring to FIG. 16C, when messages transmitted and received in the message chat room are checked with a scroll input, an icon 1630 indicating a specific message that has been an object of the check request message may be displayed adjacent to the region 1610 displayed with the specific message.

FIGS. 17A through 20 are conceptual views illustrating embodiments of a user interface associated with a case where a check request message is received while transmitting to and receiving from another user terminal.

Figure 17A:
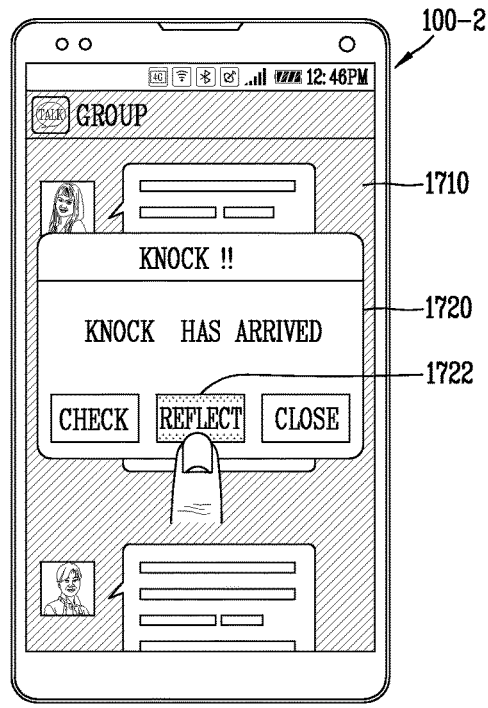
FIGS. 17A, 17B, 17C, 17D, 18, 19 and 20 are conceptual views illustrating embodiments of a user interface associated with a case where a check request message is received while transmitting to and receiving from another user terminal.

Referring to FIG. 17A, a check request message of the specific message received from a first chat room 1740 may be displayed as a pop-up window 1720 while performing a messenger dialog in a second chat room 1710. Accordingly, the user may touch and select a reflect icon 1722 contained in a pop-up window 1720.

Figure 17B:
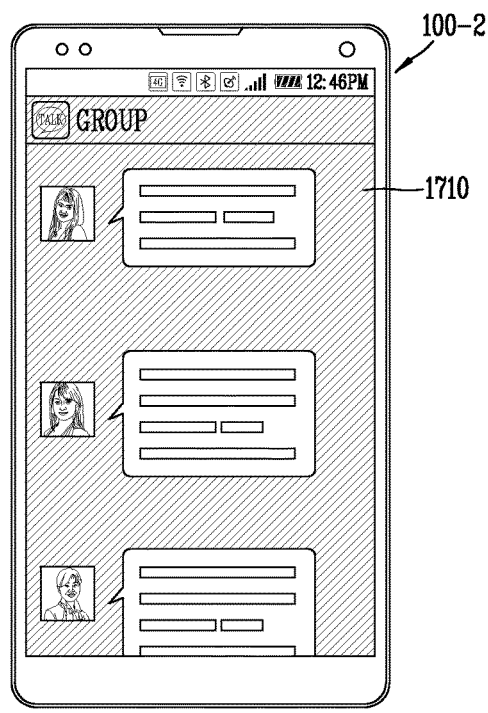

Referring to FIG. 17B, the pop-up window 1720 that has been displayed by the selection of the reflect icon 1722 may disappear to show again the second chat room 1710 in which a dialog has been carried out.

Figure 17C:
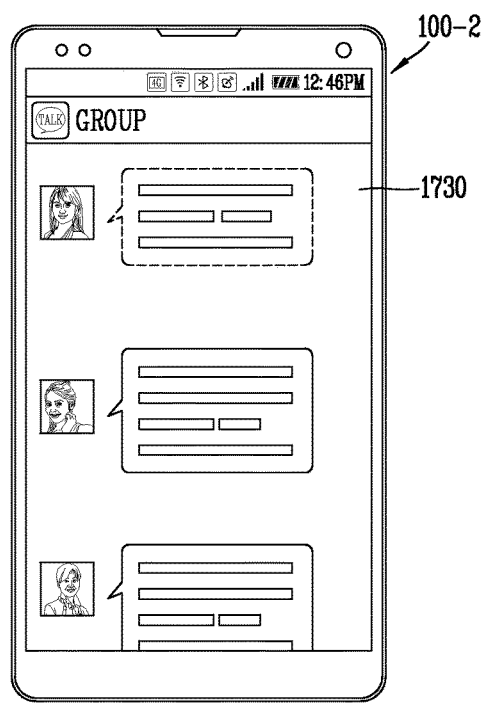

For another embodiment, referring to FIG. 17C, a first chat room 1730 in which the received specific message has been transmitted and received may be displayed by the selection of the reflect icon 1722. As described above, an automatic scroll input may be applied to the first chat room 1730 until the specific message is displayed at the top side of the screen 151.

Figure 17D:
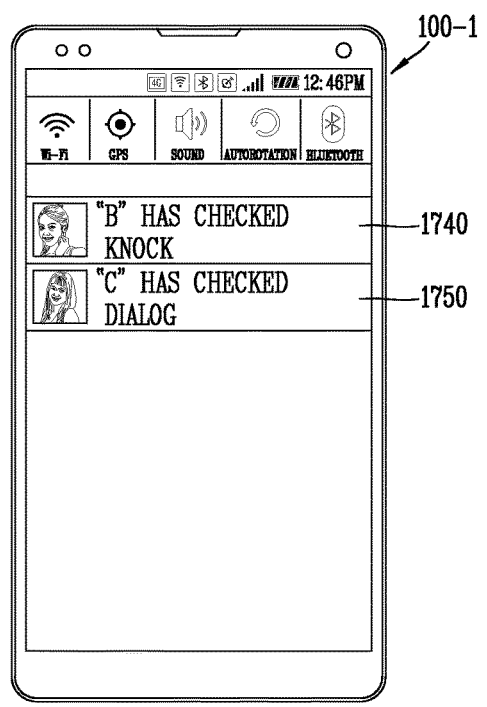

FIG. 17D is a conceptual view illustrating a user interface of the user terminal 100-1 that has transmitted a check request message, in which message check status of the user terminal 100-2 that has received the check request message is displayed.

Referring to FIG. 17D, "check request message has been checked" in the user terminal (B) that has received the check request message may be displayed in one region of the status bar of the user terminal 100-1.

Specifically, as illustrated in FIGS. 17A and 17B, when the reception of a check request message has been checked in the user terminal (B) but the specific message (check required message) of the check request message has not yet checked, "check request message has been checked" may be displayed in the user terminal (B).

For another embodiment, "(specific) message has been checked" may be displayed in the user terminal (C) that has received a check request message in one region 1750 of the status bar of the user terminal 100-1.

Specifically, as illustrated in FIGS. 17A and 17C, when the user terminal (C) has checked a check request message and a specific message (check required message) of the check request message, "(specific) message has been checked" may be displayed in the user terminal (C).

Figure 18:
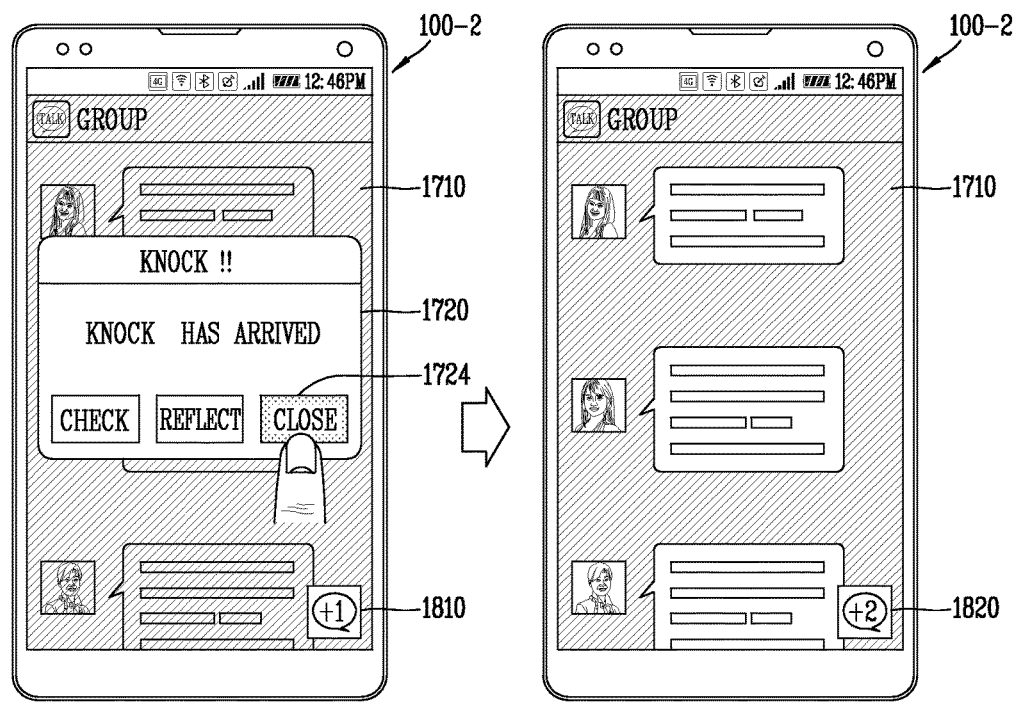

For another embodiment, referring to FIG. 18, a check request message of the received specific message may be displayed as a pop-up window 1720 while performing a messenger dialog in the second chat room 1710. Accordingly, the user may touch and select a close icon 1724 contained in the pop-up window 1720.

Furthermore, a knock icon 1810 indicating the number of check request messages received from at least one user terminal may be displayed on the message dialog window.

Referring to FIG. 18, the pop-up window 1720 that has been displayed by the selection of the close icon 1724 may disappear to show again the second chat room 1710 in which a dialog has been carried out. Furthermore, the number of received check request messages displayed on the knock icon 1820 may increase by one according to the reception of the check request message.

Figure 19:
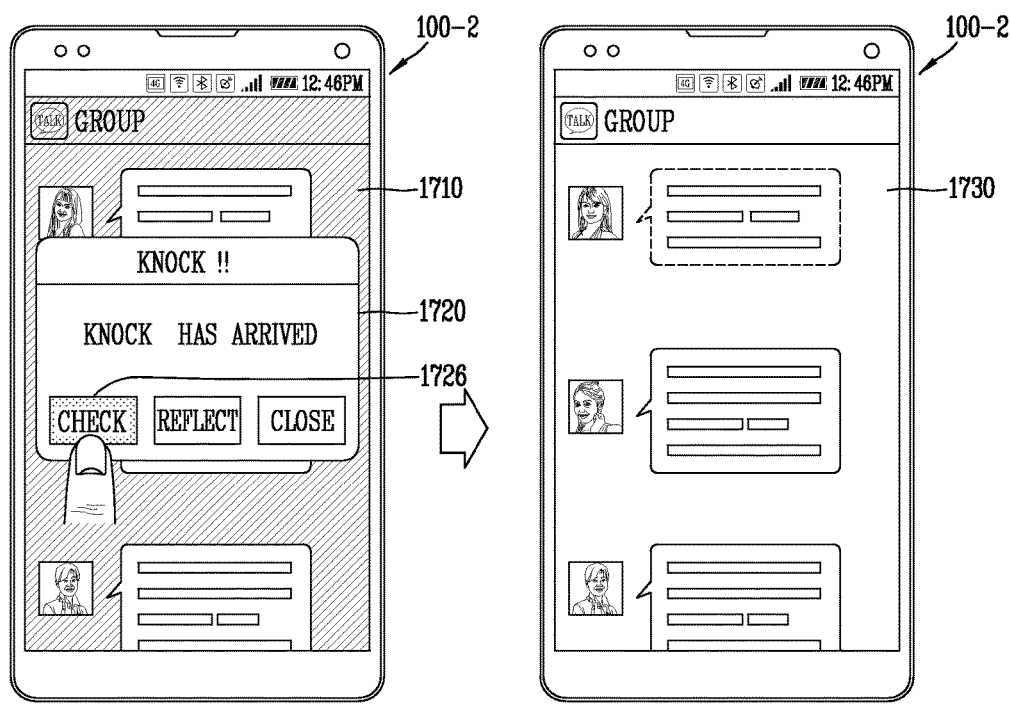

For another embodiment, referring to FIG. 19, a check request message of the received specific message may be displayed as a pop-up window 1720 while performing a messenger dialog in the second chat room 1710. Accordingly, the user may touch and select a check icon 1726 contained in the pop-up window 1720.

Referring to FIG. 19, a first chat room 1730 in which the received specific message has been transmitted and received may be displayed by the selection of the check icon 1726. As described above, an automatic scroll input may be applied to the first chat room 1730 until the specific message is displayed at the top side of the screen 151.

Figure 20:
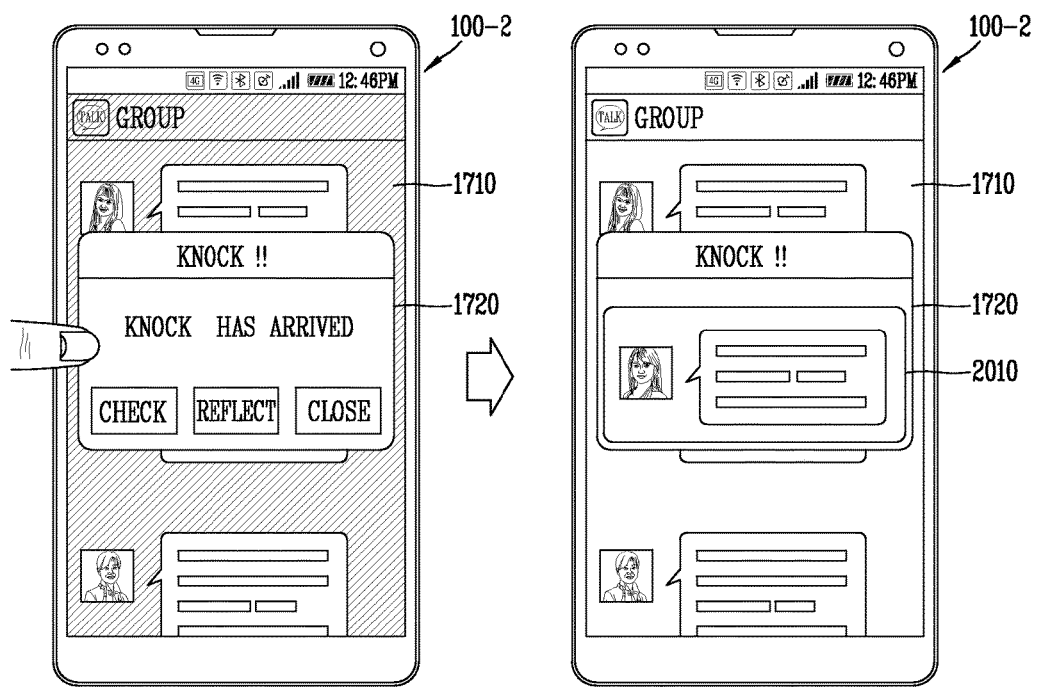

For another embodiment, referring to FIG. 20, a check request message of the received specific message may be displayed as a pop-up window 1720 while performing a messenger dialog in the second chat room 1710. Accordingly, the user may apply a long touch input to one region of the pop-up window 1720.

Referring to FIG. 20, a pop-up window 2010 displayed with the specific message may be displayed on a pop-up window 1720 of the check request message.

FIGS. 21 through 24 are conceptual views illustrating embodiments of a user interface associated with checking records associated with a check request message that has been received or transmitted.

Figure 21A:
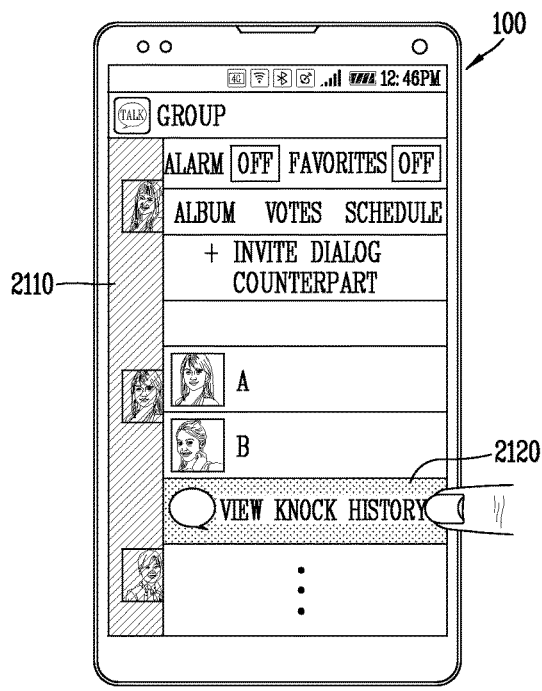
FIGS. 21A, 21B, 21C, 22, 23, 24A and 24B are conceptual views illustrating embodiments of a user interface associated with checking records associated with a check request message that has been received or transmitted.

Referring to FIG. 21A, a history menu 2120 of the check request message may be displayed as one of the environment settings of each messenger chat room.

Specifically, a "view knock history" menu 2120 may be displayed as one of the environment settings of the first chat room 2110. Accordingly, when the user touches and selects the "view knock history" menu 2120, specific messages of the received or transmitted check request message may be displayed in the first chat room 2110.

Figure 21B:
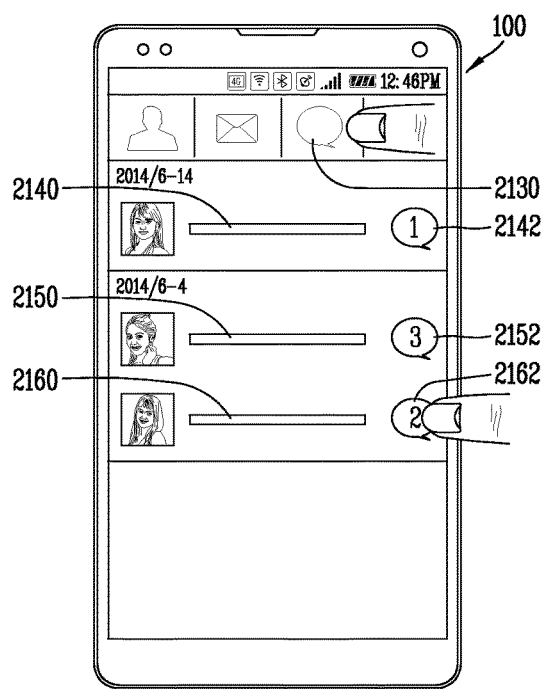

Referring to FIG. 21B, a knock history tap 2130 may be displayed as one of messenger menus. Accordingly, when the user touches and selects the knock history tap 2130, specific messages 2140, 2150, 2160 of the previously received or transmitted check request message may be displayed.

For an embodiment, a date on which the check request message has been received or transmitted, specific messages 2140, 2150, 2160 of the check request message received or transmitted on the relevant date, and an icon 2142, 2152, 2162 indicating a number for which the user has requested the checking of the specific message or a number for which the checking of the specific message has been requested may be displayed.

Specifically, it is seen that the user has requested the checking of a first message 2140 or the checking of the first message 2140 has been requested on Jun. 14, 2014.

Similarly, it is seen that a number for which the user has requested the checking of a second message 2150 or the checking of the second message 2150 has been requested is total three. Furthermore, it is seen that a number for which the user has requested the checking of a third message 2160 or the checking of the third message 2160 has been requested is total two.

Figure 21C:
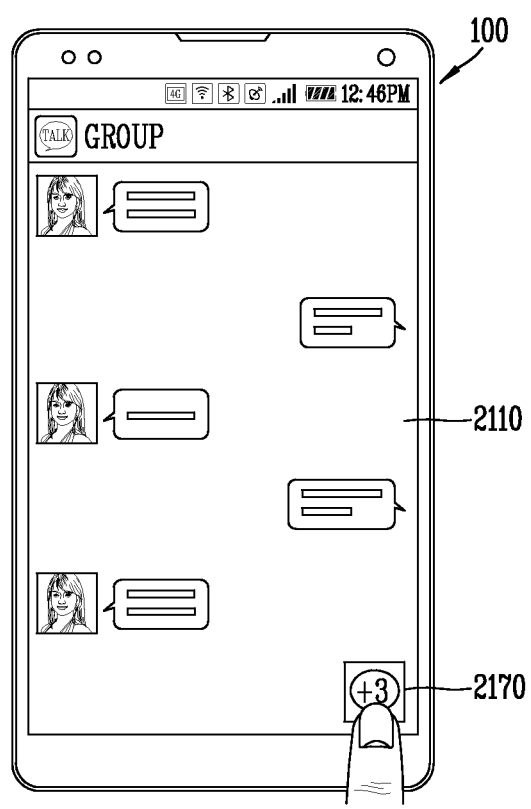

Referring to FIG. 21C, an icon 2170 indicating the number of received check request messages may be displayed in one region of the first chat room 2110. Specifically, it is seen that three check request messages have been received through the icon 2170.

For another embodiment, an icon 2170 displayed in one region of the first chat room 2110 may indicate the number of received or transmitted check request messages. Specifically, it is seen that total three check request messages have been received or transmitted through the icon 2170.

On the other hand, conditions such as a user (user terminal) that has transmitted and received a knock, a type of knock (received or transmitted), a date, a period or the like may be additionally set to search a knock history showing knocks that have been transmitted and received up to now. In other words, the filter function of a knock history may be carried out.

Figure 22:
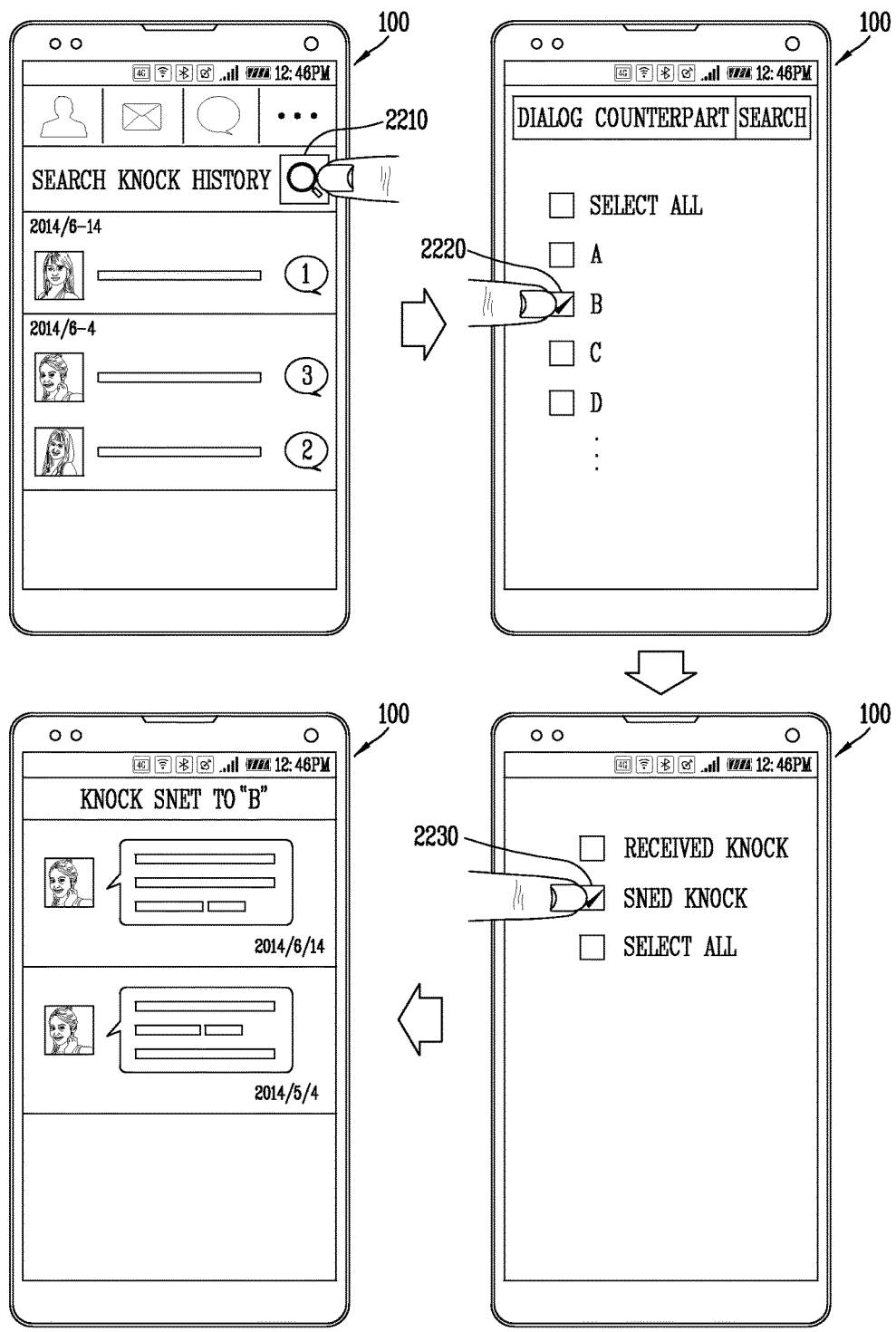

Referring to FIG. 22, a specific condition may be added to search knocks that have been transmitted and received up to now. To this end, a search knock history icon 2210 may be touched and selected.

Referring to FIG. 22, a user (user terminal) that has transmitted and received a knock may be selected. For example, when the user touches a check box 2220 for selecting the user terminal (B), a check indicator may be displayed on the check box 2220 to select the user terminal (B).

Referring to FIG. 22, a condition on whether or not a knock has been received or transmitted may be added to search a knock history. For example, when the user touches a check box 2230 for selecting a knock that has been sent by the user, a check indicator may be displayed on the check box 2230 to select the sent knock.

Referring to FIG. 22, a knock history searched according to an added condition may be displayed. Specifically, a knock that has been sent to the user terminal (B) may be displayed for each date.

Figure 23:
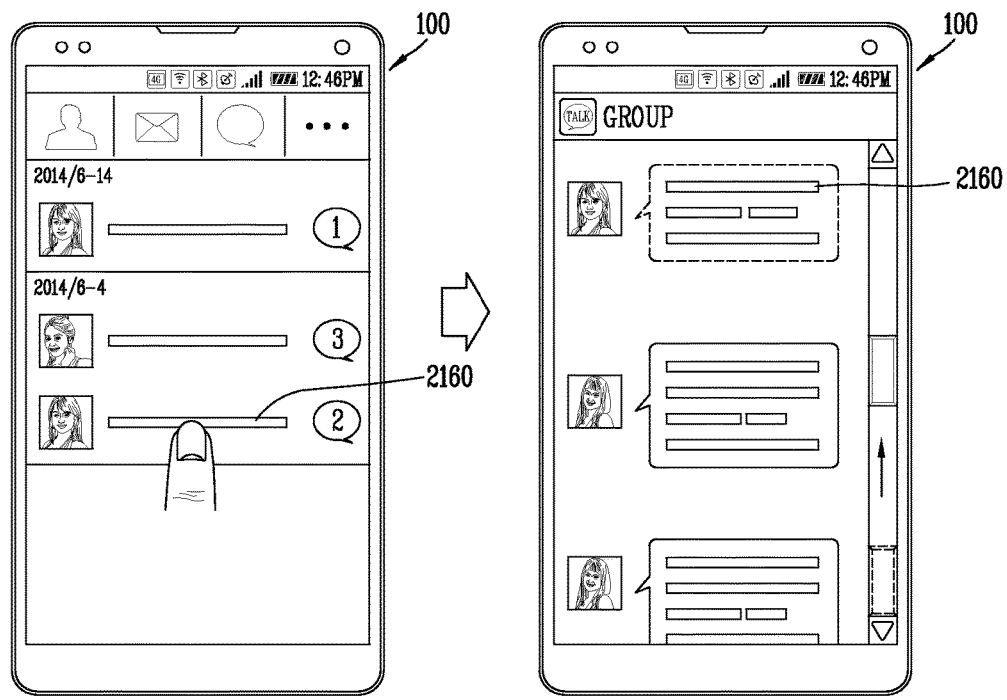

For another embodiment, referring to FIG. 23, when a knock history tap 2130 is selected as illustrated in FIG. 21B, specific messages 2140, 2150, 2160 of the previously received or transmitted check request message may be displayed. Subsequently, the user may touch and select one 2160 of the displayed specific messages 2140, 2150, 2160.

Referring to FIG. 23, the user enters a chat room that has transmitted and received the selected specific message 2160. At this time, an automatic scroll input may be applied to a dialog window to display the specific message 2160 at the top of the dialog window, and a blinking effect may be displayed on a dialog balloon of the specific message 2160 to highlight the specific message 2160.

Figure 24A:
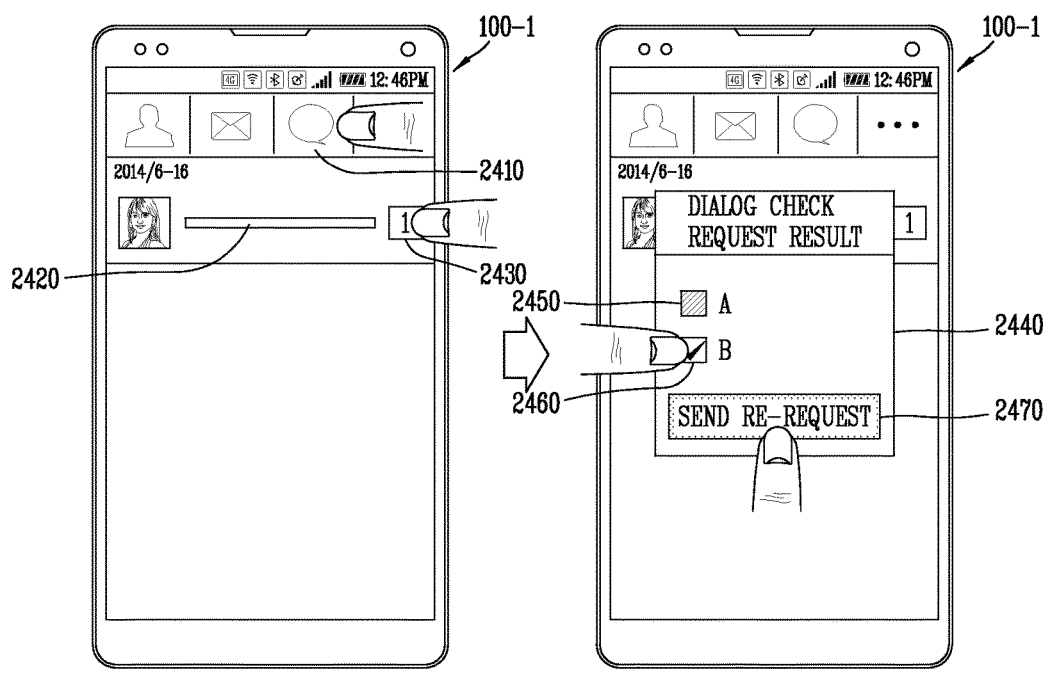

For another embodiment, referring to FIG. 24A, when a knock history tap 2140 is selected, a specific message 2420 of the previously transmitted check request message and an icon 2430 indicating the number of persons (user terminals) who have not checked the specific message 2420 may be displayed.

Subsequently, the user may touch and select the icon 2430 indicating the number of persons (user terminals) who have not checked the specific message 2420.

Referring to FIG. 24A, the user may transmit a check request message to display a pop-up window 2440 showing a result (knock transmitted result) for the checking of the specific message has been requested.

For an embodiment, a list (A, B) of users (user terminals) for which the checking of a specific message has been requested may be displayed on the relevant pop-up window 2440. Furthermore, an icon 2470 capable of transmitting the check request message again may be displayed.

Specifically, when a check box 2460 capable of selecting the user (B) who has not checked the specific message, a check indicator can be displayed to select the user terminal of the user (B).

On the other hand, a blurry image effect may be additionally displayed on a check box 2450 capable of selecting the user (A) who has checked the specific message among users who have received the checking of the specific message.

Subsequently, when touching and selecting the check box 2460 of user "B" and then touching and selecting a re-request send icon 2470, a check request message may be re-transmitted to the terminal of the user (B).

Figure 24B:
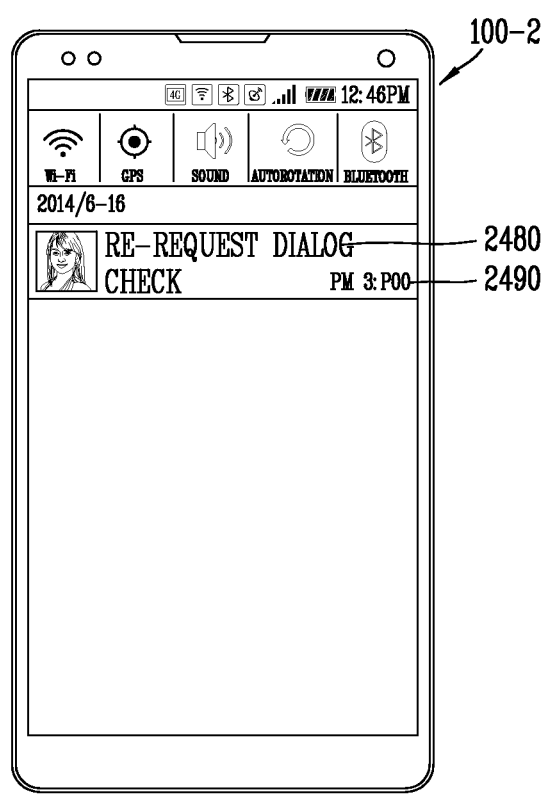

FIG. 24B is a conceptual view illustrating an embodiment of the terminal of user "B" that has re-received a check request message.

Referring to FIG. 24B, when a previously received knock to the same specific message is displayed on the status bar of the terminal of the user (B), a message 2480 indicating that dialog checking has been re-requested and a re-received time 2490 may be updated and displayed.

The effect of a mobile terminal and a control method thereof according to the present disclosure will be described as follows.

According to at least one of the embodiments of the present disclosure, there is an advantage of solving inconvenience in which an additional means for transmitting a one-to-one message or making a call to a terminal that has not checked the message should be used.

Furthermore, according to at least one of the embodiments of the present disclosure, it has an advantage in which a check request message can be received to check an important message.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include the controller 180 of the mobile terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a display configured to display information;
a wireless communication unit configured to transmit and receive information; and
a controller configured to:
cause the display to display at least one message transmitted to at least one external mobile terminal;
cause the display to display an icon corresponding to a selected message of the at least one message in response to a selection of the selected message;
cause the wireless communication unit to transmit a check request message requesting checking of the selected message to a first external mobile terminal selected from the at least one external mobile terminal;
cause the display to display a plurality of icons respectively corresponding to a plurality of search conditions;
select one or more search conditions based on a user input for selecting at least one icon among the plurality of icons;
search for at least one check request message of a plurality of check request messages that have been transmitted or received, wherein the search is based on the one or more selected search conditions of the at least one check request message; and cause the display to display at least one message associated with the at least one check request message returned by the search which satisfies the one or more selected search conditions, wherein the transmitted check request message causes the first external mobile terminal to display the selected message at a specific position of a messaging dialog window by automatically scrolling the messaging dialog window to a specific scroll position corresponding to when the selected message was received at the first external mobile terminal, and to display text of the selected message with a distinct display effect different from text of other displayed messages of the messaging dialog window.

2. The mobile terminal of claim 1, wherein the icon indicates whether the selected message has been checked at the at least one external mobile terminal.

3. The mobile terminal of claim 1, wherein the display is further configured to receive touch inputs and the selection of the selected message comprises a touch input received via the display at a display region of the selected message.

4. The mobile terminal of claim 1, wherein:
the display is further configured to receive touch inputs;
the first external mobile terminal is selected in response to a touch input received via the display selecting a corresponding first user icon of a displayed at least one user icon corresponding to the at least one external mobile terminal; and
the controller is further configured to cause the display to display a first image effect for an icon of the at least one user icon that corresponds to an external mobile terminal that has checked the selected message.

5. The mobile terminal of claim 4, wherein the controller is further configured to cause the display to display a second image effect for an icon of the at least one user icon that corresponds to an external mobile terminal that has received a check request message related to the selected message.

6. The mobile terminal of claim 1, wherein the controller is further configured to cause the wireless communication unit to transmit an additionally entered message with the check request message.

7. A control method of a mobile terminal, the method comprising:
displaying at least one message transmitted to at least one external mobile terminal;
displaying an icon corresponding to a selected message of the at least one message in response to a selection of the selected message;
transmitting a check request message requesting checking of the selected message to a first external mobile terminal selected from the at least one external mobile terminal;
displaying a plurality of icons respectively corresponding to a plurality of search conditions;
selecting one or more search conditions based on a user input for selecting at least one icon among the plurality of icons;
searching for at least one check request message of a plurality of check request messages that have been transmitted or received, wherein the search is based on one or more selected search conditions of the at least one check request message; and
displaying at least one message associated with the at least one check request message returned by the search which satisfies the one or more selected search conditions, wherein the transmitted check request message causes the first external mobile terminal to display the selected message at a specific position of a messaging dialog window by automatically scrolling the messaging dialog window to a specific scroll position corresponding to when the selected message was received at the first external mobile terminal, and to display text of the selected message with a distinct display effect different from text of other displayed messages of the messaging dialog window.

8. The method of claim 7, wherein the icon indicates whether the selected message has been checked at the at least one external mobile terminal.

9. The method of claim 7, wherein the selection of the selected message comprises a touch input received via a display of the mobile terminal at a display region of the selected message.

10. The method of claim 7, wherein:
the first external mobile terminal is selected in response to a touch input received via a display of the mobile terminal selecting a corresponding first user icon of a displayed at least one user icon corresponding to the at least one external mobile terminal; and
the method further comprises displaying a first image effect for an icon of the at least one user icon that corresponds to an external mobile terminal that has checked the selected message.

11. The method of claim 10, further comprising displaying a second image effect for an icon of the at least one user icon that corresponds to an external mobile terminal that has received a check request message related to the selected message.

12. The method of claim 7, further comprising transmitting an additionally entered message with the check request message.

13. A mobile terminal, comprising:
a display configured to display information;
a wireless communication unit configured to transmit and receive information; and
a controller configured to:
cause the display to display a check request message received from an external mobile terminal via the wireless communication unit, the check request message requesting checking of a transmitted message transmitted by the external mobile terminal;
cause the display to display the transmitted message at a specific position in a messaging dialog window by automatically scrolling the messaging dialog window to a specific scroll position corresponding to when the selected message was received at the mobile terminal, and to display text of the selected message with a distinct display effect different from text of other displayed messages of the messaging dialog window based on the received check request message when a first region of a screen displaying the check request message is selected;
cause the display to display a plurality of icons respectively corresponding to a plurality of search conditions;
select one or more search conditions based on a user input for selecting at least one icon among the plurality of icons;
search for at least one check request message of a plurality of check request messages that have been transmitted or received, wherein the search is based on one or more selected search conditions of the at least one check request message; and cause the display to display at least one message associated with the at least one check request message returned by the search which satisfies the one or more selected search conditions.

14. The mobile terminal of claim 13, wherein the controller is further configured to:
   cause the display to display an icon for transmitting a check acknowledgement message to the external mobile terminal indicating that the transmitted message has been checked by the mobile terminal; and
   cause the wireless communication unit to transmit the check acknowledgement message to the external terminal in response to a selection of the displayed icon.

15. The mobile terminal of claim 13, wherein the controller is further configured to cause the display to display an additionally received message with the check request message received via the wireless communication unit.

16. The mobile terminal of claim 13, wherein the controller is further configured to cause the display to display an icon on the messaging dialog window indicating a number of check request messages received from the external mobile terminal.

17. A control method of a mobile terminal, the method comprising:
   receiving a transmitted message transmitted by an external mobile terminal;
   displaying a check request message received from an external mobile terminal requesting checking of the transmitted message; and
   displaying the transmitted message at a specific position in a message dialog window by automatically scrolling the messaging dialog window to a specific scroll position corresponding to when the selected message was received at the mobile terminal, and to display text of the selected message with a distinct display effect different from text of other displayed messages of the messaging dialog window based on the received check request message when a first region of a screen displaying the check request message is selected;
   displaying a plurality of icons respectively corresponding to a plurality of search conditions;
   selecting one or more search conditions based on a user input for selecting at least one icon among the plurality of icons;
   searching for at least one check request message of a plurality of check request messages that have been transmitted or received, wherein the search is based on one or more selected search conditions of the at least one check request message; and
   displaying at least one message associated with the at least one check request message returned by the search which satisfies the one or more selected search conditions.

18. The method of claim 17, further comprising:
   displaying an icon for transmitting a check acknowledgement message to the external mobile terminal indicating that the transmitted message has been checked by the mobile terminal; and
   transmitting the check acknowledgement message to the external mobile terminal in response to a selection of the displayed icon.

19. The method of claim 17, further comprising displaying an additionally received message with the check request message.

20. The method of claim 17, further comprising displaying an icon on the messaging dialog window indicating a number of check request messages received from the external mobile terminal.

* * * * *